US012562950B2

(12) United States Patent
Kim et al.

(10) Patent No.: US 12,562,950 B2
(45) Date of Patent: Feb. 24, 2026

(54) APPARATUS AND METHOD FOR HIGH-SPEED SYNCHRONIZATION IN WIRELESS COMMUNICATION

(71) Applicant: SAMSUNG ELECTRONICS CO., LTD., Suwon-si (KR)

(72) Inventors: Jinmin Kim, Hwaseong-si (KR); Hyeonjun Kim, Suwon-si (KR); Hyunbae Jeon, Suwon-si (KR); Jung Woon Lee, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 415 days.

(21) Appl. No.: 18/057,423

(22) Filed: Nov. 21, 2022

(65) Prior Publication Data

US 2023/0164015 A1     May 25, 2023

(51) Int. Cl.
H04L 27/26        (2006.01)
H04W 56/00        (2009.01)

(52) U.S. Cl.
CPC ..... H04L 27/2657 (2013.01); H04W 56/0035 (2013.01)

(58) Field of Classification Search
CPC ........................ H04L 27/2657; H04W 56/0035
See application file for complete search history.

(56) References Cited

U.S. PATENT DOCUMENTS

| 8,169,890 B2 | 5/2012 | Lakkis |
| 8,437,432 B2 | 5/2013 | McLaughlin et al. |

| 10,056,993 B2 | 8/2018 | Clancy et al. |
| 10,177,809 B1 | 1/2019 | McElroy et al. |
| 10,491,264 B1 | 11/2019 | Mulvaney et al. |
| 10,826,727 B1 | 11/2020 | Zhou et al. |
| 2009/0022139 A1 | 1/2009 | Lee et al. |
| 2010/0272150 A1 | 10/2010 | Kil et al. |
| 2015/0312078 A1 | 10/2015 | Bogdan |
| 2016/0233928 A1* | 8/2016 | Murakami ........... H04B 7/0456 |

(Continued)

FOREIGN PATENT DOCUMENTS

| CN | 101406017 A | 4/2009 |
| JP | 2010-135900 A | 6/2010 |

(Continued)

OTHER PUBLICATIONS

European Search Report dated Apr. 11, 2023 in corresponding European Patent 22209491.4 (11 pages).

(Continued)

*Primary Examiner* — Samina F Choudhry
(74) *Attorney, Agent, or Firm* — Morgan, Lewis & Bockius LLP

(57)        ABSTRACT

A method includes calculating first correlation values corresponding to a first symbol duration based on input samples, the input samples being generated from a received signal; calculating phase differences respectively corresponding to the input samples based on the first correlation values and second correlation values corresponding to a second symbol duration preceding the first symbol duration; updating accumulative phase differences respectively corresponding to the input samples based on the phase differences; and detecting a symbol boundary based on the updated accumulative phase differences.

20 Claims, 22 Drawing Sheets

(56) References Cited

U.S. PATENT DOCUMENTS

2019/0327120 A1 * 10/2019 Yun ..................... H04L 27/2621
2021/0099329 A1 4/2021 Hellfajer et al.

FOREIGN PATENT DOCUMENTS

KR     10-0918846      9/2009
TW       200908598 A    2/2009

OTHER PUBLICATIONS

Liu, et al., "All-Digital Synchronization for SC/OFDM Mode of IEEE 802.15.3c and IEEE 802.11ad", in ISSS Transactions on Circuits and Systems, Regular Papers, vol. 62, No. 2, Feb. 2, 2015, pp. 545-553.
Notice Of Allowance issued Jan. 7, 2026 in corresponding Taiwanese Patent Application No. 111145162.

* cited by examiner

| Code Index | Code Sequence | Channel number |
|---|---|---|
| 1 | − 0 0 0 0 + 0 − 0 + + + 0 + − 0 0 0 + − + + + 0 0 − + 0 − 0 0 | 0, 1, 8, 12 |
| 2 | 0 + 0 + − 0 + 0 + 0 0 0 − + + 0 − + − − − 0 0 + 0 0 + + 0 0 0 | 0, 1, 8, 12 |
| 3 | − + 0 + + 0 0 0 − + − + + 0 0 + + 0 + 0 0 − 0 0 0 0 − 0 + 0 − | 2, 5, 9, 13 |
| 4 | 0 0 0 0 + − 0 0 − 0 0 − + + + + 0 + − + 0 0 0 + 0 − 0 + + 0 − | 2, 5, 9, 13 |
| 5 | − 0 + − 0 0 + + + − + 0 0 0 − + 0 + + + 0 − 0 + 0 0 0 0 − 0 0 | 3, 6, 10, 14 |
| 6 | + + 0 0 + 0 0 − − − + − 0 + + − 0 0 0 + 0 + 0 − + 0 + 0 0 0 0 | 3, 6, 10, 14 |
| 7 | + 0 0 0 0 + − 0 + 0 + 0 0 + 0 0 0 + 0+ + − − − 0 − + 0 0 − + | 4, 7, 11, 15 |
| 8 | 0 + 0 0 − 0 − 0 + + 0 0 0 0 − − + 0 0 − + 0 + + − + + 0 + 0 0 | 4, 7, 11, 15 |

FIG. 7A

| Channel Number | $C_i$ Code Length | Peak PRF (MHz) | Mean PRF (MHz) | Delta Length $\delta_L$ | #Chip Per Symbol | Symbol Duration $T_{PSYM}$ (ns) | Base Rate Msymbol/s |
|---|---|---|---|---|---|---|---|
| {0:15} | 31 | 31.20 | 16.10 | 16 | 496 | 993.59 | 1.01 |
| {0:3, 5:6, 8:10, 12:14} | 31 | 7.80 | 4.03 | 64 | 1984 | 3974.39 | 0.25 |
| {0:15} | 127 | 124.80 | 62.89 | 4 | 508 | 1017.63 | 0.98 |

FIG. 7B

| $C_i$ Code Length | Peak PRF (MHz) | Mean PRF (MHz) | Delta Length $\delta_L$ | #Chip Per Symbol | Symbol Duration $T_{PSYM}$ (ns) | Base Rate Msymbol/s |
|---|---|---|---|---|---|---|
| 91 | 124.8 | 111.09 | 4 | 364 | 729.17 | 1.37 |

FIG. 16A

APPARATUS AND METHOD FOR HIGH-SPEED SYNCHRONIZATION IN WIRELESS COMMUNICATION

CROSS-REFERENCE TO RELATED APPLICATIONS

This application claims priority under 35 U.S.C. § 119 to Korean Patent Application No. 10-2021-0164866 and 10-2022-0030944, filed on Nov. 25, 2021, and Mar. 11, 2022, in the Korean Intellectual Property Office, the entire disclosures of which are hereby incorporated by reference.

TECHNICAL FIELD

The present disclosure relates to wireless communication, and more particularly, to an apparatus and method for high-speed synchronization in wireless communication.

Wireless network technologies include wireless local area network (WLAN) technology and wireless personal area network (WPAN) technology. A WLAN is a group of locally located computers or other devices that form a wireless network which is based on radio transmissions rather than wired connections. A WLAN may be based on an Institute of Electrical and Electronics Engineers (IEEE) 802.11 standard, and may be formed in a radius of about 100 m. A WPAN is a personal area wireless network that interconnect devices centered around an individual person's workplace based on wireless connections. A WPAN may be based on the IEEE 802.15 standard, and include Bluetooth, ZigBee, ultra-wide band (UWB), etc. A wireless network includes a plurality of communication devices, and the communication devices collect packets in real time and transmit packets in an active period.

SUMMARY

A method includes calculating first correlation values corresponding to a first symbol duration based on input samples, the input samples being generated from a received signal; calculating phase differences respectively corresponding to the input samples based on the first correlation values and second correlation values corresponding to a second symbol duration preceding the first symbol duration; updating accumulative phase differences respectively corresponding to the input samples based on the phase differences; and detecting a symbol boundary based on the updated accumulative phase differences. An apparatus includes a first buffer configured to store input samples generated from a received signal and corresponding to a first symbol duration; a processing circuit configured to calculate first correlation values respectively corresponding to the input samples based on the input samples; a second buffer configured to store second correlation values corresponding to a second symbol duration preceding the first symbol duration; and a third buffer configured to store accumulative phase differences respectively corresponding to the input samples, wherein the processing circuit is further configured to: calculate phase differences respectively corresponding to the input samples, based on the first correlation values and the second correlation values; update the accumulative phase differences based on the phase differences; and detect a symbol boundary based on the updated accumulative phase differences. An apparatus includes a memory storing a series of instructions; and at least one processor configured to, by executing the series of instructions, calculate first correlation values corresponding to a first symbol duration and respectively corresponding to input samples, the input samples being generated from a received signal; calculate phase differences respectively corresponding to the input samples, based on the first correlation values and second correlation values corresponding to a second symbol duration preceding the first symbol duration; update accumulative phase differences respectively corresponding to the input samples based on the phase differences; and detect a symbol boundary based on the updated accumulative phase differences. A method includes receiving a wireless signal from a device; identifying input samples corresponding to a first symbol duration based on the wireless signal; calculating first correlation values respectively corresponding to the input samples; calculating phase differences respectively corresponding to the input samples based on the first correlation values and second correlation values corresponding to a second symbol duration preceding the first symbol duration; updating accumulative phase differences respectively corresponding to the input samples based on the phase differences; performing simultaneous time and frequency synchronization based on the updated accumulative phase differences; and processing the wireless signal based on the simultaneous time and frequency synchronization.

BRIEF DESCRIPTION OF THE DRAWINGS

Embodiments of the present disclosure will be more clearly understood from the following detailed description taken in conjunction with the accompanying drawings in which:

FIG. 2 is a block diagram illustrating a wireless communication device according to an embodiment;

FIG. 6 is a diagram illustrating an example of a preamble code according to an embodiment;

FIGS. 7A and 7B are diagrams illustrating preamble parameters according to embodiments;

FIGS. 16A and 16B are block diagrams illustrating examples of synchronizers according to embodiments.

DETAILED DESCRIPTION

Figure 1:
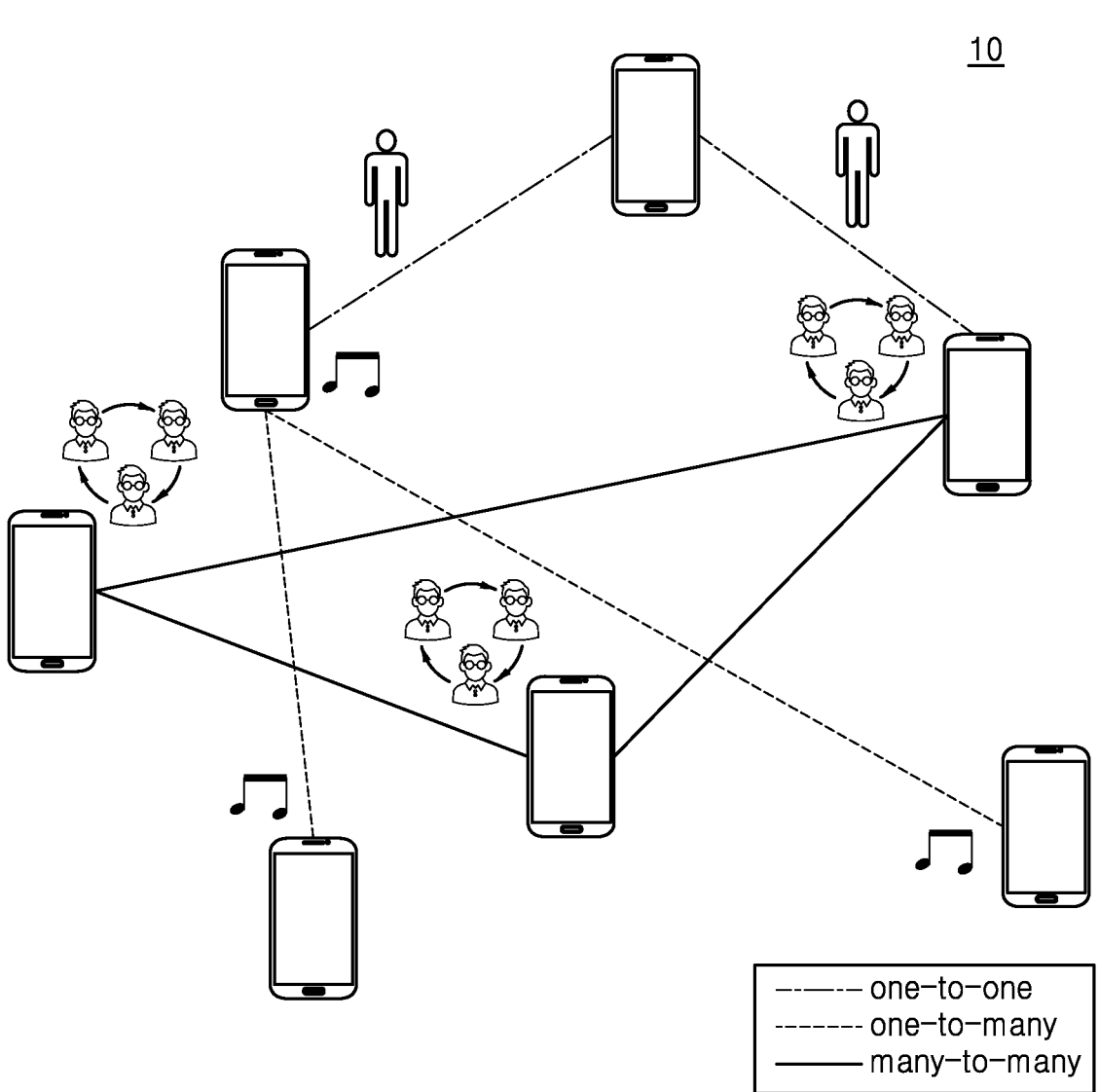
FIG. 1 is a diagram illustrating a wireless network according to an embodiment.

FIG. 1 is a diagram illustrating a wireless network 10 according to an embodiment. Specifically, FIG. 1 shows examples of device-to-device (D2D) communication in the wireless network 10.

As an example of the wireless network 10, a wireless personal area network (WPAN) may be formed in a relatively short radius of about 10 m. As an example of a WPAN, ultra-wide band (UWB) may refer to a communication technology, in a baseband, using a wide frequency band equal to or greater than several GHz, low spectral density, and short pulse width or a band to which or UWB communication is applied. The IEEE 802.15.4 standard specifies a physical (PHY) layer and a medium access control (MAC) sublayer of UWB. The IEEE 802.15.4 standard defines high rate pulse repetition frequency UWB (HRP-UWB) and low rate pulse repetition frequency UWB (LRP-UWB), and recently IEEE 802.15.4z has defined higher pulse repetition frequency UWB (HPRF-UWB) in HRP-UWB. The present disclosure uses UWB as an example of the wireless communication technology used in the wireless network 10, but it is noted that the present disclosure is not necessarily limited to UWB and may be applied to other wireless communication technologies.

Device-to-Device (D2D) communication may refer to a method in which geographically close wireless communication devices directly communicate with each other without using an infrastructure, such as a base station. D2D communication may use an unlicensed frequency band, such as Wi-Fi Direct and Bluetooth, or may improve the frequency use efficiency of a cellular system by utilizing a licensed frequency band. In some embodiments of the present disclosure, D2D communication may refer to communication between wireless communication devices as well as communication between things or thing intelligent communication in the Internet of Things (IoT).

Referring to FIG. 1, the wireless network 10 may include various communication schemes. For example, as shown by a dashed-dotted line in FIG. 1, one-to-one communication, in which one wireless communication device communicates with one wireless communication device, may occur in the wireless network 10. Also, as shown by a dashed line in FIG. 1, one-to-many communication, in which one wireless communication device communicates with a plurality of wireless communication devices, may occur in the wireless network 10. Also, as shown by the solid line in FIG. 1, many-to-many communication, in which a plurality of wireless communication devices communicate with a plurality of wireless communication devices, may occur in the wireless network 10. The wireless communication device (i.e., a receiver) may obtain synchronization based on a preamble of a signal received from another wireless communication device (i.e., a transmitter). A preamble is a signal used in network communications to synchronize transmission timing between two or more systems. In general, preamble is a synonym for "introduction." The role of the preamble is to define a specific series of transmission criteria that make components such as transmitters and receivers to known in advance that data is to be transmitted. For example, as will be described below with reference to FIG. 3, the transmitter may transmit a PHY protocol data unit (PPDU) including a synchronization header (SHR), and the SHR may have a structure known in advance to the transmitter and the receiver. The receiver may perform channel estimation after completing synchronization of time and frequency. When time required for synchronization increases in the receiver, the accuracy of channel estimation may decrease, and thus, communication performance, such as positioning and throughput, may deteriorate. In addition, when using more resources to reduce the time required for synchronization, the cost, such as chip size and power consumption, may increase and that may result in lower wireless communication efficiency.

As will be described below with reference to the drawings, the wireless communication device may include an apparatus that provides high-speed synchronization, and accordingly, the time needed for the receiver to complete time and frequency synchronization may be reduced. For example, a coherent integration may be used for synchronization despite a carrier frequency offset, and accordingly, the time needed for a symbol boundary to be accurately detected may be reduced. In addition, the detection of the symbol boundary and the detection of the carrier frequency offset may be completed at the same time, and accordingly, resources required for synchronization may be reduced. In addition, due to that the time for synchronization may be reduced, the time for channel estimation may be extended, and accordingly, the accuracy of channel estimation may improve, and communication performance may increase.

Figure 2:
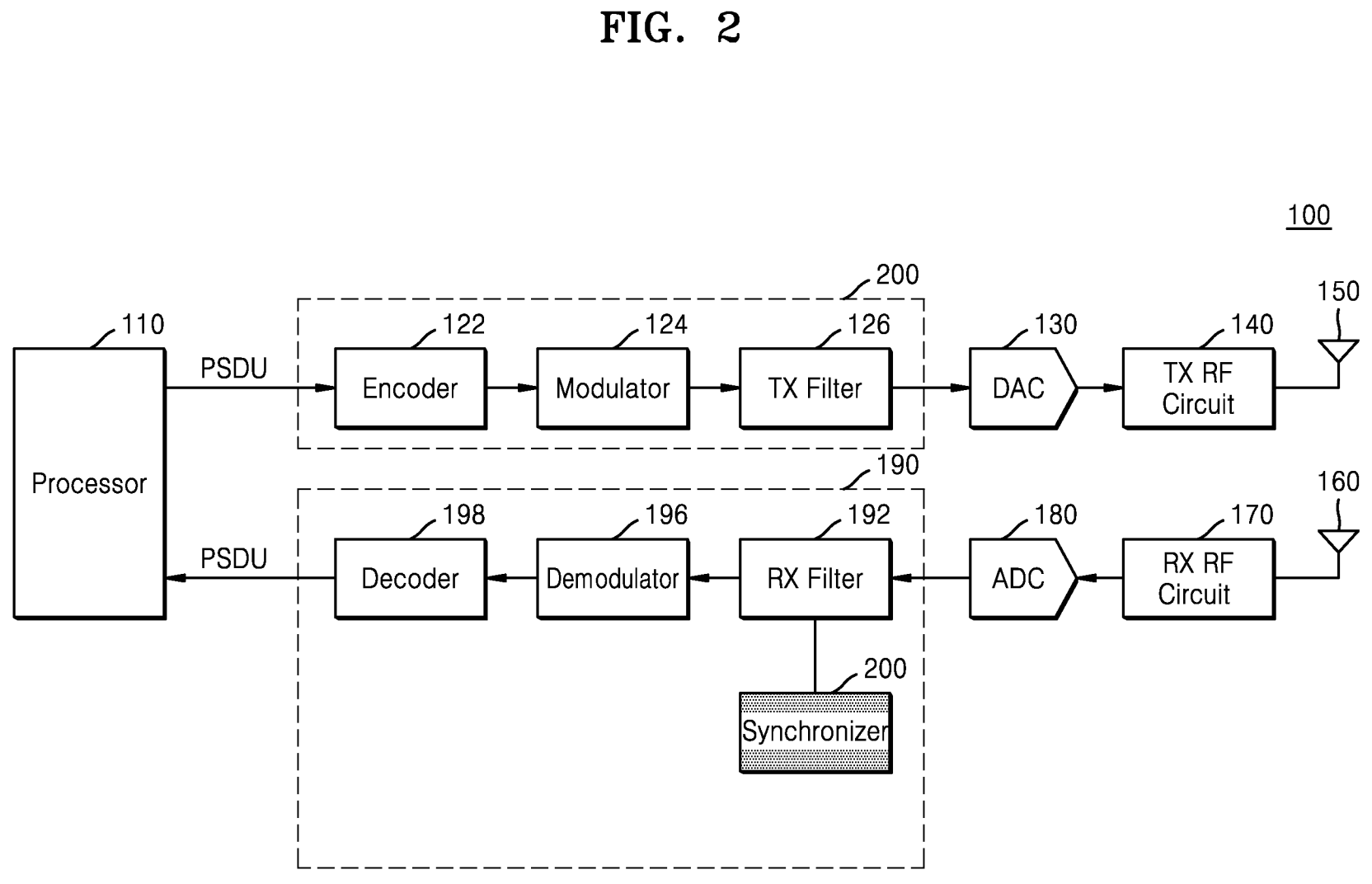

FIG. 2 is a block diagram illustrating a wireless communication device 100 according to an embodiment. The wireless communication device 100 may refer to a device that performs wireless communication in the wireless network 10 of FIG. 1. For example, the wireless communication device 100 may be a portable device, such as a mobile phone, a laptop PC, a tablet PC, etc., a stationary device, such as a desktop PC, a smart TV, a kiosk, etc., a vehicle, such as an automobile, personal mobility machine, etc., or a component included in the devices described above. As shown in FIG. 2, the wireless communication device 100 may include a processor 110, a transmit (TX) data path 120, a digital-to-analog converter (DAC) 130, a TX RF circuit 140, a TX antenna. 150, a receive (RX) antenna 160, an RX RF circuit 170, an analog-to-digital converter (ADC) 180, and an RX data path 190. A radio frequency (RF) circuit is a type of analog circuit operating at the high frequencies suitable for wireless transmission. An RF circuit may use inductive elements to tune the resonant circuit operation around a specific radio carrier frequency. In some embodiments, the components of the wireless communication device 100 may be embedded in one chip or may be respectively embedded in two or more chips mounted on a printed circuit board (PCB). In some embodiments, the TX data path 120 and the RX data path 190 may be embedded in one chip, and may be collectively referred to as a modem. Also, in some embodiments, the DAC 130 and/or the ADC 180 may be included in the modem.

The processor 110 may provide a PHY service data unit (PSDU) to the TX data path 120 and may receive the PSDU from the RX data path 190. The processor 110 may generate the PSDU from data to be transmitted to another wireless communication device, and may provide the PSDU to the TX data path 120. In addition, the processor 110 may extract data transmitted by another wireless communication device from the PSDU received from the RX data path 190. An example of the PSDU will be described below with reference to FIG. 3. In some embodiments, the processor 110 may execute an operating system (OS), and may execute at least one application on the OS, and the PSDU may be generated or processed by the OS and/or the at least one application.

The TX data path 120 may receive the PSDU from the processor 110 and may provide a digital signal to the DAC 130. As shown in FIG. 2, the TX data path 120 may include an encoder 122, a modulator 124, and a TX filter 126. The encoder 122 may encode the PSDU provided from the processor 110. For example, the encoder 122 may encode the PSDU based on Reed-Solomon encoding, and add a PHY header (PHR) including single error correct double error detect (SECDED) bits to the encoded PSDU. The encoder 122 may use various encoding methods, including convolutional encoding, and may insert the SHR after performing spreading. The modulator 124 may generate a PPDU by modulating a signal provided from the encoder 122. For example, the modulator 124 may modulate the PHR, based on burst position modulation (BPM) and binary phase-shift keying (BPSK), and modulate the spread PSDU, i.e., a PHY payload, to a rate specified in the PHR. The TX filter 126 may filter the PPDU provided from the modulator 124.

The DAC 130 may convert a digital signal output from the TX data path 120 into an analog signal, and the TX RF circuit 140 may generate an RF signal from the analog signal and may provide the RF signal to the TX antenna 150. In this example, an RF signal may be referred to as a transmitting signal. In some embodiments, the TX RF circuit 140 may include an analog filter, an analog mixer, and/or a power amplifier.

The RX RF circuit 170 may generate an analog signal from the RF signal received from the RX antenna 160, and may provide the analog signal to the ADC 180. In some embodiments, the RX RF circuit 170 may include an analog filter, an analog mixer, and/or a low noise amplifier. The ADC 180 may convert the analog signal provided from the RX RF circuit 170 into a digital signal, and may provide the digital signal to the RX data path 190. In some embodiments, the RX RF circuit 170 may extract an in-phase (I) signal and a quadrature (Q) signal from the RF signal received via the RX antenna 160, and the ADC 180 may provide I samples and Q samples generated by sampling the I signal and the Q signal, respectively, to the RX data path 190.

The RX data path 190 may receive the digital signal from the ADC 180 and may provide the PSDU to the processor 110. As shown in FIG. 2, the RX data path 190 may include an RX filter 192, a synchronizer 194, a demodulator 196, and a decoder 198. The RX filter 192 may filter the digital signal provided from the ADC 180. The synchronizer 194 may perform synchronization based on the digital signal provided by the RX filter 192, and may provide a result of synchronization to the RX filter 192. For example, the digital signal may include a series of samples and the synchronizer 194 may perform time synchronization by detecting the symbol boundary from input samples received from the RX filter 192. In this example, the sample may be referred to as input samples. Also, the synchronizer 194 may perform frequency synchronization by detecting an initial phase and a carrier frequency offset (CFO) of the input samples. In some embodiments, the input sample provided from the RX filter 192 may include a sample corresponding to the I signal and a sample corresponding to the Q signal.

The synchronizer 194 may provide information about the detected initial phase and carrier frequency offset to the RX filter 192, and the RX filter 192 may provide the PPDU to the demodulator 196 by compensating for the phase and carrier frequency offset based on the information provided from the synchronizer 194. The synchronizer 194 may also inform other components, such as the demodulator 196 and/or the decoder 198, of the completion of synchronization in the RX data path 190. The demodulator 196 may demodulate the PPDU received from the RX filter 192, and the decoder 198 may generate the PSDU by decoding the signal provided from the demodulator 196 and provide the PSDU to the processor 110. In some embodiments, the demodulator 196 and the decoder 198 may perform operations corresponding to the modulator 124 and the encoder 122 described above, respectively.

Figure 3:
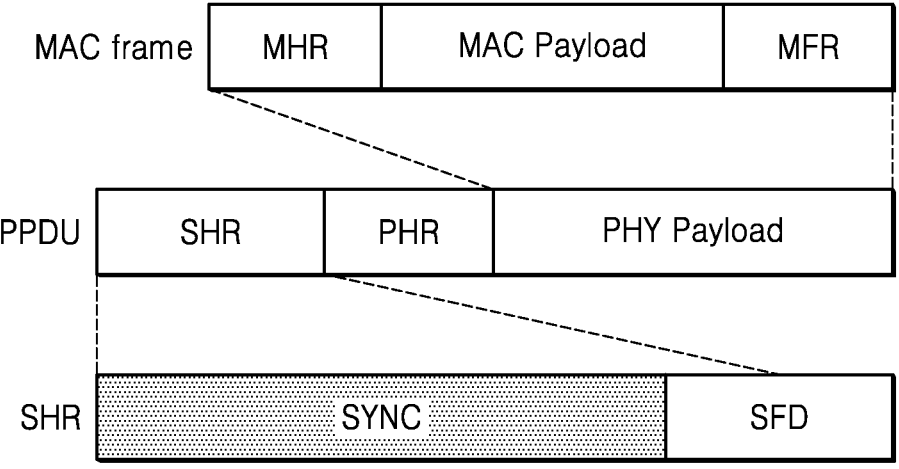
FIG. 3 is a diagram illustrating a physical (PHY) protocol data unit (PPDU) according to an embodiment.

FIG. 3 is a diagram illustrating a PPDU according to an embodiment. Specifically, FIG. 3 shows the PPDU used in HRP-UWB. In some embodiments, the wireless communication device 100 of FIG. 2 may transmit the PPDU to, or receive the PPDU from, another wireless communication device.

Referring to FIG. 3, the PPDU may include an SHR, a PHR, and a PHY payload (or a PHY payload field). The SHR may include a code known in advance to a transmitter and a receiver, and the receiver may perform synchronization and channel estimation based on the SHR and the code. As shown in FIG. 3, the SHR may include a SYNC field and a start of frame delimiter (SFD) field. The SYNC field may be referred to as a preamble and may include $N_{SYNC}$ repeated preamble symbols, which may be referred to as symbols herein. $N_{SYNC}$ may be known in advance to the transmitter and receiver. An example of a symbol included in the SYNC field will be described below with reference to FIG. 5. The SFD field may inform that the PHR starts after the SYNC field ends. The SFD field may be used to build frame timing. For example, in ranging, the time at which an SFD is detected may be determined to be a packet frame transmission time and/or a packet frame reception time. In some embodiments, the SFD field may include 8 or 16 symbols.

The PHR may include information for decoding the PHY payload. For example, the PHR may include information used for PSDU transmission, including information about a data rate, a preamble length, a PSDU length, etc. In some embodiments, the PHR may include 16 symbols. The MAC frame may include a MAC header (MHR), a MAC payload, and a MAC footer (MFR). The MAC frame may be transferred to the PHY as a PSDU, which is a PPDU payload.

FIGS. 4A to 4D are diagrams illustrating examples of PPDUs according to embodiments. Specifically, FIGS. 4A to 4D show examples of PPDU used in HPRF-UWB as defined in the IEEE 802.11.4z standard. In some embodiments, the wireless communication device 100 of FIG. 2 may transmit at least one of the PPDUs of FIG. 4A to 4D to or receive at least one of the PPDUs of FIGS. 4A to 4D from another wireless communication device. In FIGS. 4A to 4D, arrows may indicate reference positions.

Figure 4A:
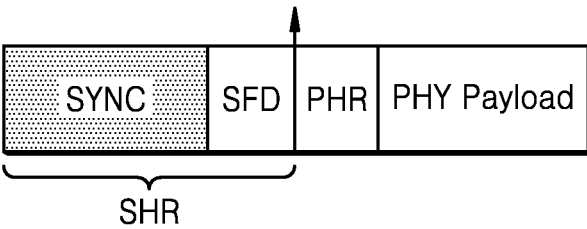
FIGS. 4A to 4D are diagrams illustrating examples of PPDUs according to embodiments.
Figure 4B:
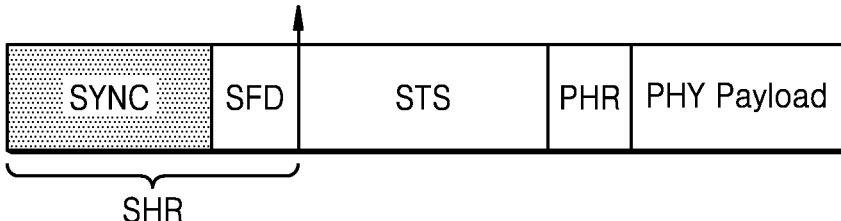
Figure 4C:
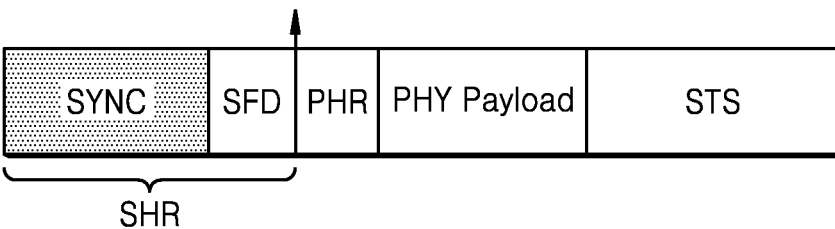
Figure 4D:
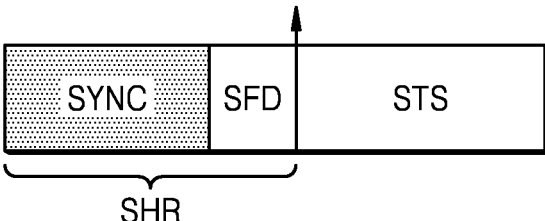

HPRF-UWB defines four different modes according to a scrambled timestamp sequence (STS) packet configuration. An STS may include a code encrypted using a key for more accurate positioning and security. Referring to FIG. 4A, in an STS packet configuration 0 (zero), the PPDU may include SHR, PHR, and PHY payload sequentially. Referring to FIG. 4B, in an STS packet configuration 1 (one), the PPDU may include SHR, STS, PHR, and PHY payload sequentially. Referring to FIG. 4C, in an STS packet configuration 2 (two), the PPDU may include SHR, PHR, PHY payload, and STS sequentially. Referring to FIG. 4D, in an STS packet configuration 3 (three), the PPDU may include SHR, SFD, and STS sequentially. In HPRF-UWB, PHR and PHY payload may be modulated based on BPSK. As shown in FIGS. 4A to 4D, SHR of the HPRF-SHR may also include a SYNC field and an SFD field, and examples of symbols included in the SYNC field will be described below with reference to FIG. 5.

Figure 5:
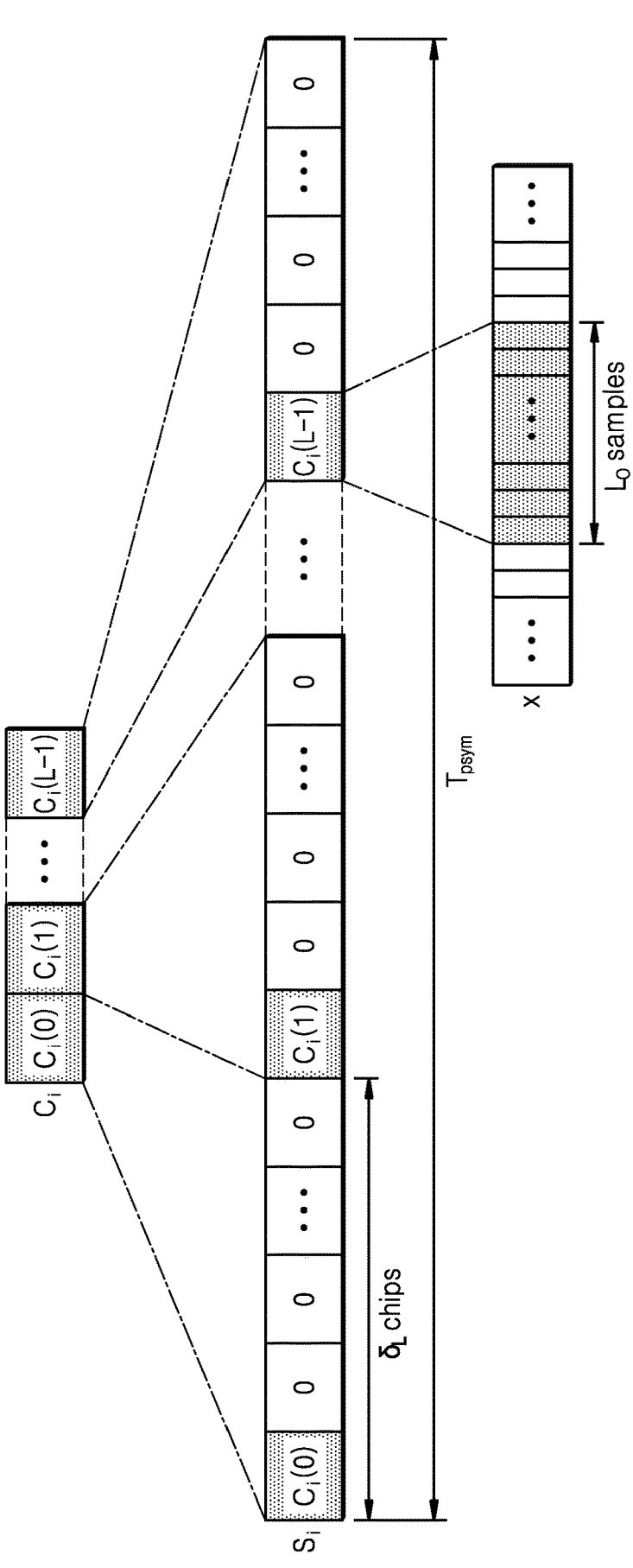
FIG. 5 is a diagram illustrating an example of a preamble symbol according to an embodiment.

FIG. 5 is a diagram illustrating an example of a preamble symbol according to an embodiment, FIG. 6 is a diagram illustrating an example of a preamble code according to an embodiment, and FIGS. 7A and 7B are diagrams illustrating preamble parameters according to embodiments.

Referring to FIG. 5, a preamble symbol $S_i$ may be included in a SYNC field of FIGS. 3 and 4A to 4D. For example, as described above with reference to FIG. 3, the preamble symbol $S_i$ may be repeated $N_{SYNC}$ times in the SYNC field. The preamble symbol $S_i$ may be configured by spreading a preamble code $C_i$ (which may be referred to as a code or a code sequence herein) having a code length L. The preamble code $C_i$ may include L elements (i.e., $C_i(0)$ $C_i(L-1)$), and each of the L elements may be a ternary element having one of $\{-1, 0, 1\}$ values. According to a code index i, the code length L of the preamble code $C_i$ and the values of elements may be defined. For example, as shown in FIG. 6, the preamble code $C_i$ of which code index i is 1 to 8 may have the code length L of 31, and may have different values according to channel numbers. In some embodiments, although not shown in FIG. 6, the preamble code $C_i$ of which code index i is 9 to 24 may have the code length L of 127, and the preamble code $C_i$ of which code index i is 25 to 32 may have the code length L of 91.

Referring back to FIG. 5, the preamble symbol $S_i$ may include a plurality of chips. When $\delta_L$ is a delta length, a first chip among $\delta_L$ consecutive chips in the preamble symbol $S_i$ may have a value of one element (e.g., $C_i(0)$) of the code $C_i$, while subsequent ($\delta_L-1$) chips may all have values of zero. The synchronizer 194 of FIG. 2 may detect, based on the code $C_i$, the SYNC field in which the symbol $S_i$ is $N_{SYNC}$ times repeated, and may identify the transmission of a UWB packet frame.

As described above with reference to FIG. 2, the synchronizer 194 may receive a series of input samples from the RX filter 192. In some embodiments, a sampling frequency of the input sample may correspond to a sampling frequency of the ADC 180, and the ADC 180 may over-sample an analog signal. For example, as shown in FIG. 5, in the series of input samples x, Lo consecutive input samples may be generated during a duration corresponding to one chip, and Lo may be referred to as an oversampling rate. As will be described below with reference to FIG. 9, in order to detect a symbol boundary, one input sample may be extracted for each of $\delta_L$Lo consecutive input samples among the series of input samples to calculate a correlation value.

Referring to FIGS. 7A and 7B, preambles of different configurations may be used according to channel numbers. As shown in FIGS. 7A and 7B, the preamble symbol $S_i$ may include 496, 1984, 508, or 364 chips. In addition, the preamble symbol $S_i$ may be configured based on the preamble code $C_i$ having the code length L of 31, 127, or 91, and the delta length 6L may be 16, 64, or 4.

Figure 8:
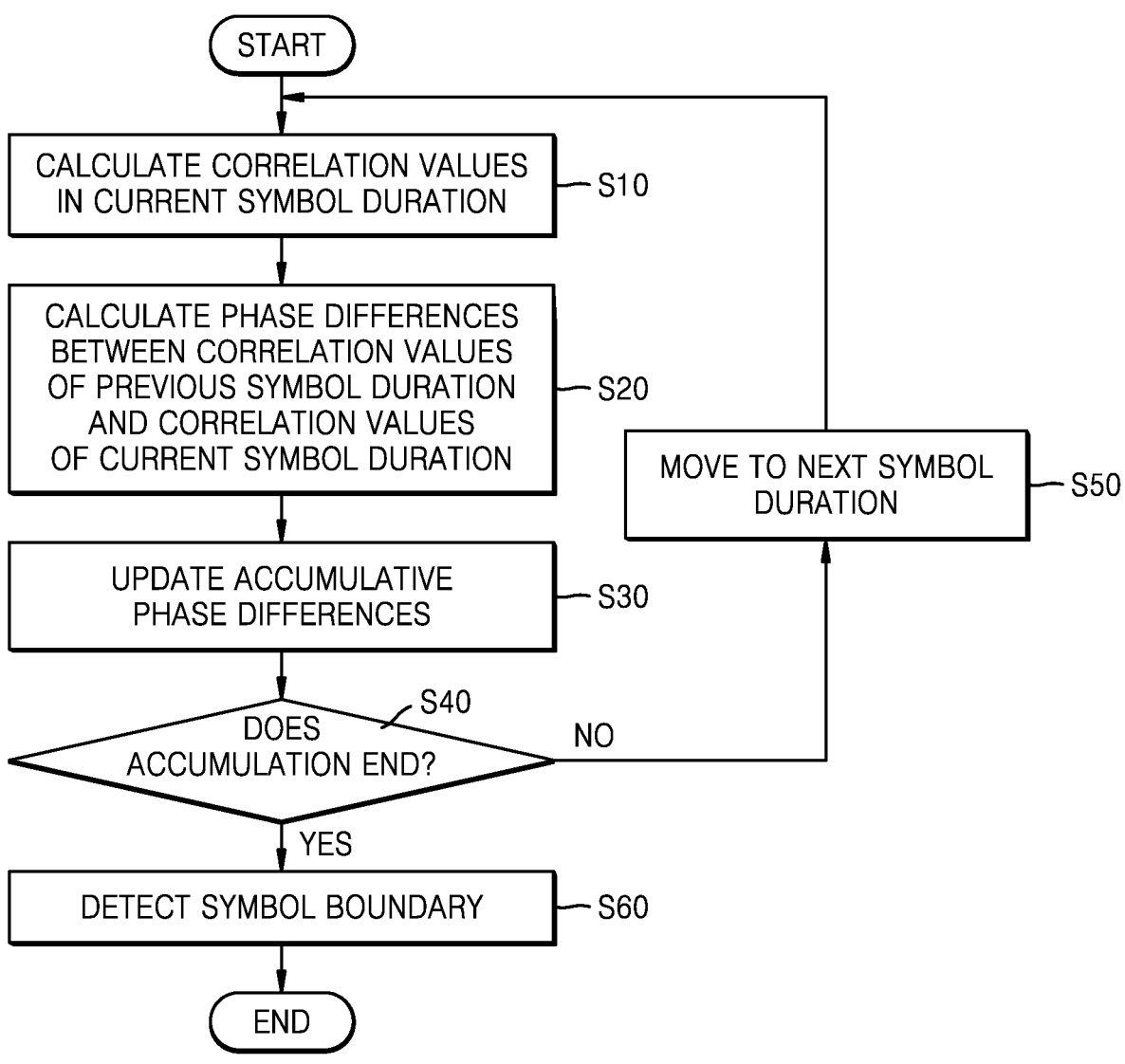
FIG. 8 is a flowchart illustrating a method for high-speed synchronization according to an embodiment.

FIG. 8 is a flowchart illustrating a method for high-speed synchronization according to an embodiment. Specifically, the flowchart of FIG. 8 shows the method for time synchronization. As shown in FIG. 8, the method for high-speed synchronization may include a plurality of rounds of operations S10 to S60. In some embodiments, the method of FIG. 8 may be performed by the synchronizer 194 of FIG. 2. Hereinafter, FIG. 8 will be described with reference to FIG. 2.

Referring to FIG. 8, correlation values may be calculated in a current symbol duration in operation S10. As described above with reference to the drawings, the preamble symbol $S_i$ may be generated based on the preamble code $C_i$ of the index i known in advance to a transmitter and a receiver, and the synchronizer 194 may detect a symbol boundary based on a position corresponding to the highest correlation value among correlation values between values extracted from the preamble symbol $S_i$ and the preamble code $C_i$. The correlation values may be complex numbers, and an example of operation S10 will be described with reference to FIG. 9.

In operation S20, phase differences between the correlation values of a previous symbol duration and the correlation values of the current symbol duration are calculated. A carrier frequency offset may occur due to a frequency deviation between an oscillator of the transmitter and an oscillator of the receiver, and accordingly, a phase difference may occur between a first correlation value (e.g., $r^{(m)}(n)$ in FIG. 9) calculated in the current symbol duration (e.g., $S'_m$ in FIG. 9), i.e., a first symbol duration, and a second correlation value (e.g., $r^{(m-1)}(n)$ in FIG. 9) calculated in the previous symbol duration (e.g., $S'_{m-1}$ in FIG. 9), i.e., a second symbol duration, corresponding to the same sample index (e.g., the sample index n in FIG. 9). When the carrier frequency offset constantly increases or decreases, the phase difference between the correlation value calculated in the current symbol duration and the correlation value calculated in the previous symbol duration, corresponding to the sample index of the symbol boundary, may be constant. On the other hand, a phase difference between the correlation value calculated in the current symbol duration and the correlation value calculated in the previous symbol duration, corresponding to a sample index that is not the symbol boundary, may vary. An example of operation S20 will be described below with reference to FIG. 10.

In operation S30, the accumulative phase differences may be updated. According to one embodiment, the accumulative phrase differences respectively corresponding to the input sample may be updated based on the phase differences. For example, the synchronizer 194 may add the phase difference calculated in operation S20 to a current accumulative phase difference, and accordingly, accumulative phase differences respectively corresponding to sample indexes may be generated. As described above, the phase differences that correspond to the sample boundary may have substantially constant values, and accordingly, the accumulative phase difference that correspond to the sample boundary may gradually increase as the phase differences accumulate. On the other hand, phase differences that do not correspond to the sample boundary may vary, and accordingly, as the phase differences accumulate, the accumulative phase differences that do not correspond to the sample boundary may gradually decrease.

In operation S40, it is determined whether the accumulation of phase differences ends. For example, the synchronizer 194 may determine whether phase differences have been accumulated with respect to previously determined M symbols. As will be described below, operation 40 may be performed using a modified integration method that overcomes the limitations of both the coherent method and the non-coherent method. A non-coherent method may accumulate absolute values of correlation values respectively corresponding to a plurality of symbols in order to detect a symbol boundary, and a coherent method may directly accumulate the correlation values. Because the accumulative phase differences may be used to detect the symbol boundary, and accordingly, the symbol boundary may be detected with fewer symbols when using a coherent method than using a non-coherent method. According to an embodiment, the synchronizer 194 may preset the number M of symbols for accumulating phase differences to a relatively small value. As shown in FIG. 8, when the continuation of accumulation is determined, i.e., the accumulation of phase difference does not end, the synchronizer 194 may move to a next symbol duration in operation S50, and may perform operations S10 to S30 again. On the other hand, when accumulation of phrase difference is determined to end, operation S50 might not be performed and operation S60 may be performed subsequently.

In operation S60, the symbol boundary may be detected. For example, the synchronizer 194 may detect the symbol boundary based on the accumulative phase differences respectively corresponding to the sample indexes. Examples of operation S60 will be described below with reference to FIGS. 12 and 14.

Figure 9:
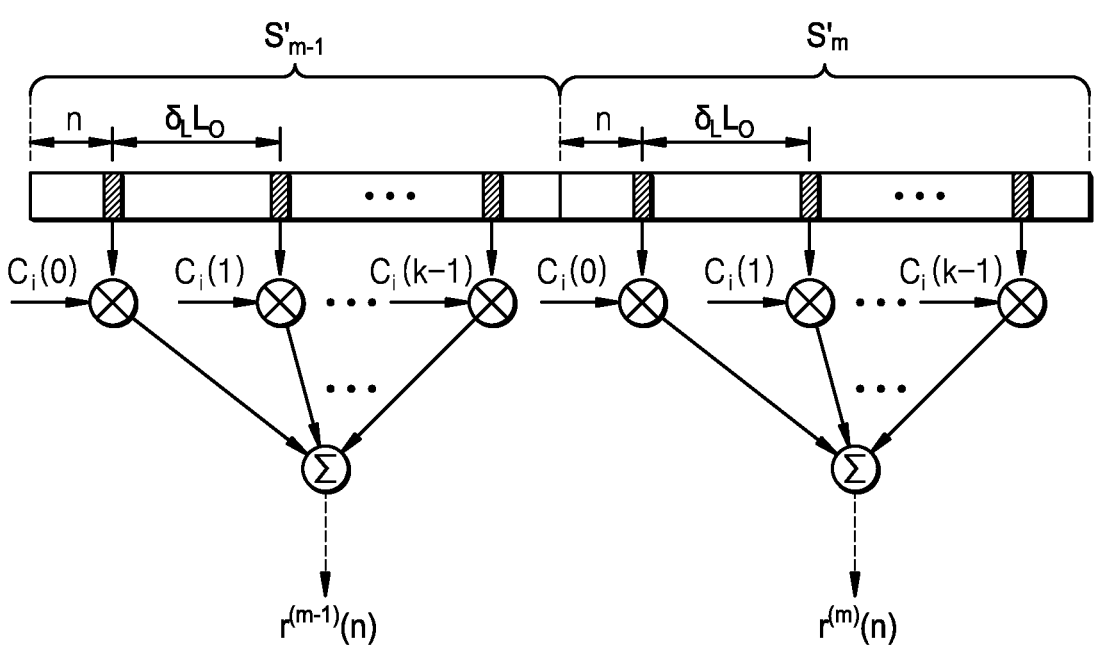
FIG. 9 is a diagram illustrating an operation of calculating correlation values according to an embodiment.

FIG. 9 is a diagram illustrating an operation of calculating correlation values according to an embodiment. As described above with reference to FIG. 8, the synchronizer 194 of FIG. 2 may calculate correlation values in one symbol duration and may calculate phase differences between the correlation values respectively corresponding to adjacent symbols. According to an embodiment, phase differences between the correlation values of adjacent symbols accumulate and do not converge to zero.

Referring to FIG. 9, a second correlation value $r^{(m-1)}(n)$ corresponding to a second symbol duration $S'_{m-1}$ may be calculated, and a first correlation value $r^{(m)}(n)$ corresponding to a first symbol duration $S'_m$ may be calculated. The input sample x(n) may refer to an n-th input sample in each of the symbol durations, the first correlation value $r^{(m)}(n)$ may be calculated from input samples spaced apart from each other at equal intervals (i.e., a constant sample index difference) including the input sample x(n) in the first symbol duration $S'_m$, and the second correlation value $r^{(m-1)}(n)$ may be calculated from input samples spaced apart from each other at equal intervals including the input sample x(n) in the second symbol duration $S'_{m-1}$. A correlation value (or a despreading value) r(n) corresponding to the input sample x(n) in one symbol duration may be calculated as in [Equation 1] below.

[Equation 1]

$$r(n) = \frac{\sum_{k=0}^{L-1} x(n - \delta_L L_o k) \times C_i(k)}{\sum_{k=0}^{T_{sym}-1} |x(k)|^2} \qquad (1)$$

In [Equation 1], Lo may be an oversampling rate according to a sampling rate of the ADC 180 of FIG. 2, $T_{sym}$ may be the number of input samples included in one symbol duration ($T_{sym}=\delta_L LOL$), and $C_i(k)$ may be a (k+1)-th value in the preamble code $C_i$ having the code index i ($0 \leq k \leq L-1$).

The non-coherent method may accumulate absolute values of correlation values respectively corresponding to a plurality of symbols in order to detect a symbol boundary, and may detect an index of an input sample corresponding to the maximum accumulative value as the symbol boundary. However, because the accumulated values respectively corresponding to input samples independent of the symbol boundary may also increase due to the use of absolute values of correlation values rather than a direct use of correlation values, the number of symbols that need to be considered for the symbol boundary may increase, and the time taken for synchronization may be extended. A coherent method may directly accumulate the correlation values respectively corresponding to the plurality of symbols so as to detect the symbol boundary, and may detect the index of the input sample corresponding to the maximum accumulative value as the symbol boundary. However, a conventional coherent method may also have its limitation in that a phase may gradually increase due to the carrier frequency offset between the transmitter and the receiver, and accordingly, an accumulated value converging to zero according to the phase in the coherent method may occur. As described above, in the method of FIG. 8, because the phase differences between the correlation values of adjacent symbols accumulate, a problem of the coherent method may be solved, and thus, synchronization may be completed early and accurately.

Figure 10:
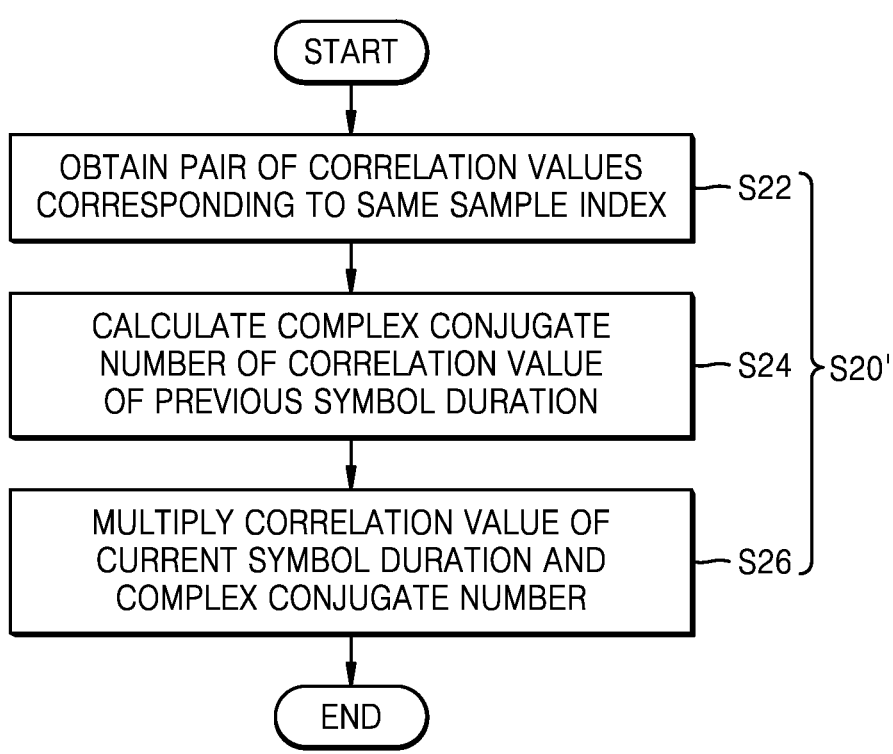
FIG. 10 is a flowchart illustrating a method for high-speed synchronization according to an embodiment.

FIG. 10 is a flowchart illustrating a method for high-speed synchronization according to an embodiment. Specifically, the flowchart of FIG. 10 shows an example of operation S20 of FIG. 8. As described above with reference to FIG. 8, in operation S20' of FIG. 10, phase differences between correlation values of a current symbol duration and correlation values of a previous symbol duration may be calculated. As shown in FIG. 10, operation S20' may include a plurality of rounds of operations S22, S24, and S26. In some embodiments, operation S20' may be performed by the synchronizer 194 of FIG. 2, and FIG. 10 will be described below with reference to FIGS. 2 and 9.

Referring to FIG. 10, a pair of correlation values corresponding to the same sample index may be obtained in operation S22. For example, the synchronizer 194 may calculate the first correlation value $r^m(n)$ of the first symbol duration $S'_m$, and may read the second correlation value $r^{(m-1)}(n)$ of the second symbol duration $S'_{m-1}$ from a buffer configured to store second correlation values (e.g., BUF2 in FIGS. 16A and 16B).

In operation S24, a complex conjugate number of the correlation value of the previous symbol duration may be calculated, and in operation S26, the correlation value of the current symbol duration may be multiplied by the complex conjugate number. For example, the synchronizer 194 may calculate a complex conjugate of the second correlation value $r^{(m-1)}(n)$, and may multiply a complex conjugate number of the second correlation value $r^{(m-1)}(n)$ by the first correlation value $r^m(n)$. That is, a phase difference $p_d^{(m)}(n)$ between the first correlation value $r^{(m)}(n)$ and the second correlation value $r^{(m-1)}(n)$ may be calculated as in Equation (2) below:

$$p_d^{(m)}(n) = r^m(n) \times \text{conj}(r^{(m-1)}(n)) \qquad (2)$$

In Equation (2), $p_d^{(m)}(n)$ may mean a phase difference between values despreaded from adjacent symbols, and may be a complex number.

Figure 11:
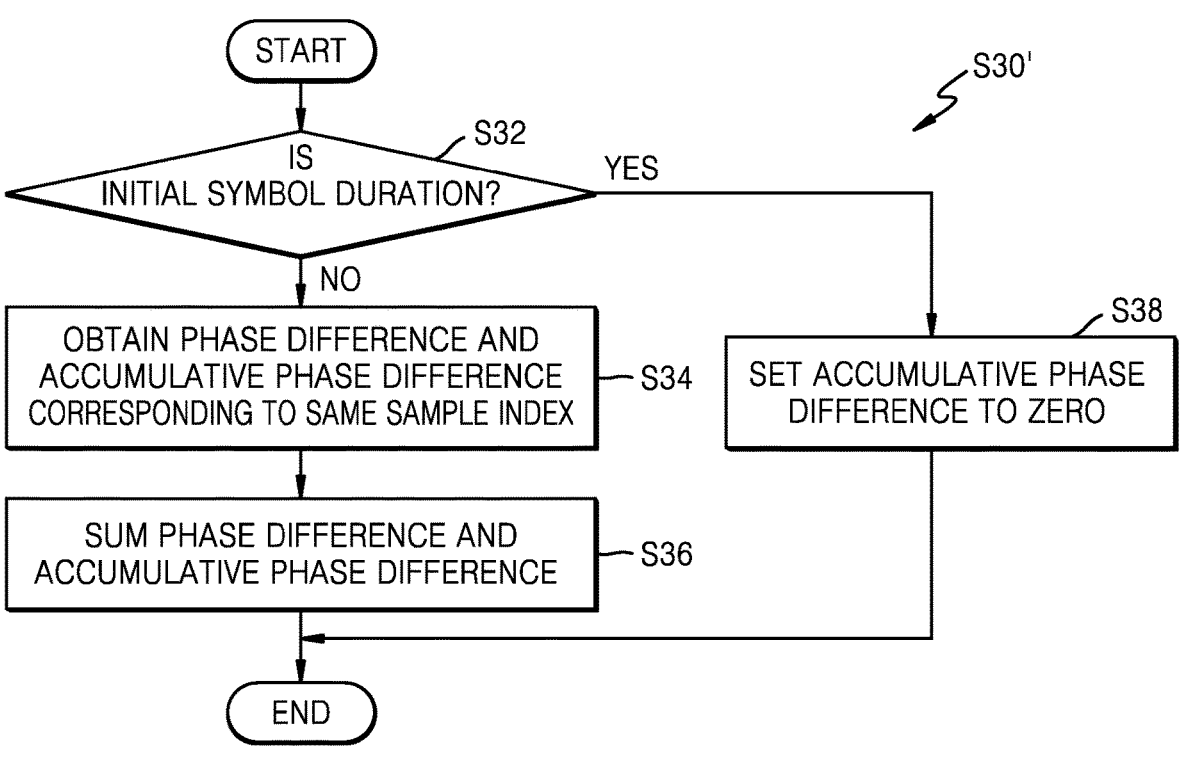
FIG. 11 is a flowchart illustrating a method for high-speed synchronization according to an embodiment.

FIG. 11 is a flowchart illustrating a method for high-speed synchronization according to an embodiment. Specifically, the flowchart of FIG. 11 shows an example of operation S30 of FIG. 8. As described above with reference to FIG. 8, accumulative phase differences may be updated in operation S30' of FIG. 11. In some cases, the accumulative phase differences are updated to respectively correspond to the input samples based on the phase differences. The updated accumulative phase differences may be used to perform simultaneous time and frequency synchronization. In some cases, a wireless signal may be processed based on the simultaneous time and frequency synchronization. According to an embodiment, the simultaneous time and frequency synchronization may be performed based on a pre-determined preamble code. As shown in FIG. 11, operation S30' may include a plurality of rounds of operations S32, S34, S36, and S38. In some embodiments, operation S30' may be performed by the synchronizer 194 of FIG. 2, and FIG. 11 will be described below with reference to FIG. 2.

Referring to FIG. 11, in operation S32, it may be determined whether a current symbol duration is an initial symbol duration. For example, the synchronizer 194 may determine whether the current symbol duration is the initial symbol duration among M symbol durations. As shown in FIG. 11, when the current symbol duration is the initial symbol duration, the accumulative phase difference may be set to zero in operation S38, and operation S30' may end. On the other hand, when the current symbol duration is not the initial symbol duration, that is, when a symbol duration preceding the current symbol duration exists, operations S34 and S36 may be performed subsequently.

In operation S34, a phase difference and the accumulative phase difference corresponding to the same sample index may be obtained. For example, the synchronizer 194 may obtain the phase difference calculated in operation S20 of FIG. 8, and read the already calculated accumulative phase difference from the buffer configured to store accumulative phase difference corresponding to the input samples (e.g., BUF3 of FIGS. 16A and 16B).

In operation S36, the phase difference and the accumulative phase difference may be summed. For example, the synchronizer 194 may update the accumulative phase difference by adding the phase difference obtained in operation S34 to the accumulative phase difference. Two phase differences $p_d^{(m)}(n)$ and $p_d^{(k)}(n)$ may be expressed by Euler's formula as Equation (3) below.

$$p_d^{(m)}(n) = r_m(\cos\theta_m + j\sin\theta_m) \tag{3}$$

$$p_d^{(k)}(n) = r_k(\cos\theta_k + j\sin\theta_k)$$

When $r_m$ and $r_k$ are approximately equal to each other, i.e., the difference between $r_m$ and $r_k$ is less than a pre-determined threshold value, the accumulative phase difference may be obtained by adding the two phase differences $p_d^{(m)}(n)$ (n) and $p_d^{(k)}(n)$, and may be calculated as Equation (4).

$$p_d^{(m)}(n) + p_d^{(k)}(n) = \tag{4}$$

$$r_m(\cos\theta_m + j\sin\theta_m) + r_k(\cos\theta_k + j\sin\theta_k) \cong 2 \cdot \cos\left(\frac{\theta_m - \theta_k}{2}\right) \cdot$$

$$r_m\left(\cos\left(\frac{\theta_m + \theta_k}{2}\right) + j\sin\left(\frac{\theta_m + \theta_k}{2}\right)\right) = 2 \cdot \cos\left(\frac{\theta_m - \theta_k}{2}\right) \cdot r_m e^{\frac{\theta_m + \theta_k}{2}}$$

Accordingly, as shown in Equation (5) below, a phase of the sum of the two phase differences $p_d^{(m)}(n)$ and $p_d^{(k)}(n)$ may be equal to an average phase difference of the two phase differences $p_d^{(m)}(n)$ and $p_d^{(k)}(n)$.

$$\angle\left(p_d^{(m)}(n) + p_d^{(k)}(n)\right) = \frac{\theta_m + \theta_k}{2} \tag{5}$$

As described above with reference to FIG. 8, when a carrier frequency offset increases or decreases with a constant inclination, $\theta_m$ and $\theta_k$ of Equation (5) may be approximately equal to each other, and the sum of the phase differences may be calculated as Equation (6) below.

$$p_d^{(m)}(n) + p_d^{(k)}(n) \cong 2 \cdot r_m e^{\theta_m} \tag{6}$$

Accordingly, as phase differences accumulate at a symbol boundary, the accumulative phase difference may increase, and the symbol boundary may be detected based on the accumulative phase difference. An accumulative phase difference $p_d^{(m)}$ updated in an m-th symbol duration may be expressed as in Equation (7) below.

$$P_d^{(m)}(n) = \begin{cases} 0 \text{ if } m = 0 \\ P_d^{(m-1)} + p_d^{(m)}(n) = \sum_{i=1}^{m} r^{(i)}(n) \times conj\left(r^{(i-1)}(n)\right) \text{ otherwise} \end{cases} \tag{7}$$

Figure 12:
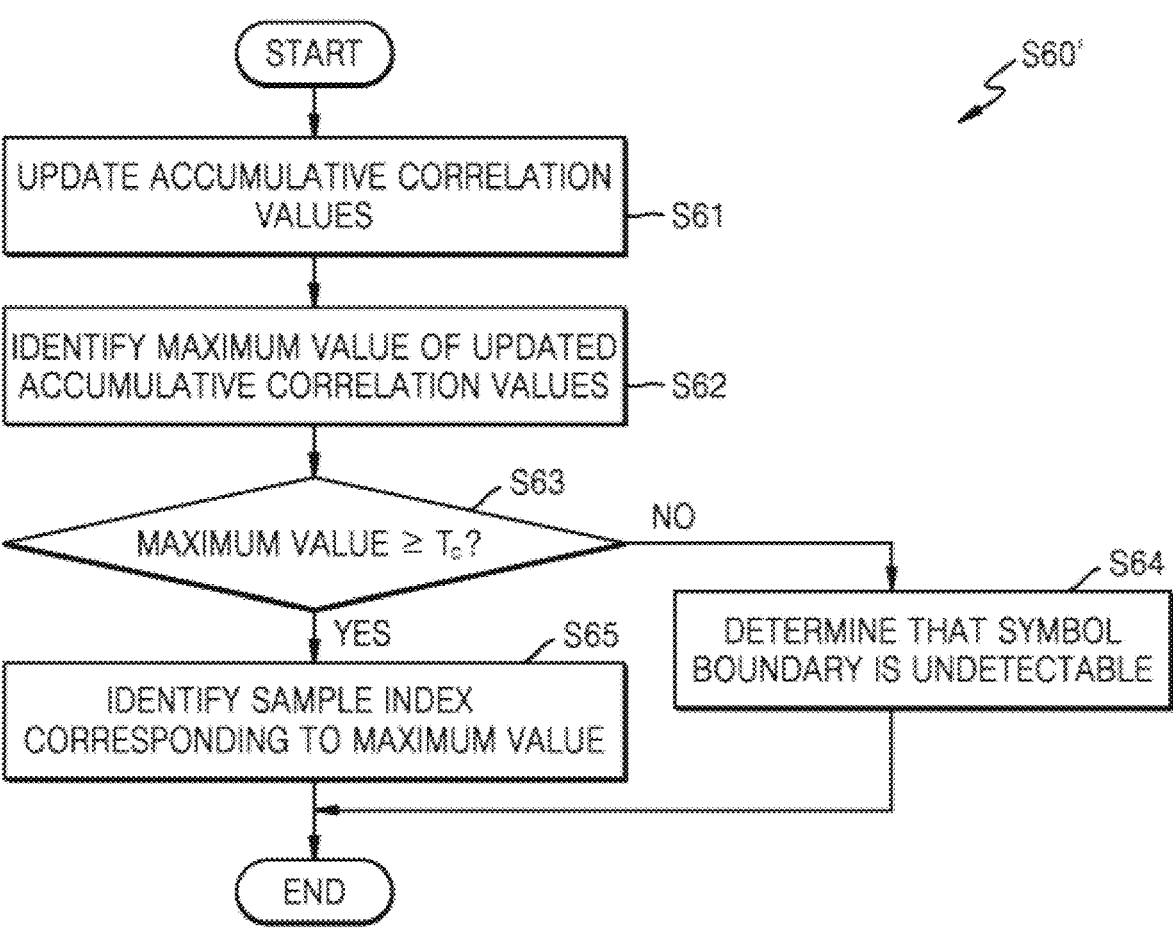
FIG. 12 is a flowchart illustrating a method for high-speed synchronization according to an embodiment.

FIG. 12 is a flowchart illustrating a method for high-speed synchronization according to an embodiment. Specifically, the flowchart of FIG. 12 shows an example of operation S60 of FIG. 8. As described above with reference to FIG. 8, a symbol boundary may be detected in operation S60' of FIG. 12. As shown in FIG. 12, operation S60' may include a plurality of rounds of operations S61 to S65. In some embodiments, operation S60' may be performed by the synchronizer 194 of FIG. 2, and FIG. 12 will be described below with reference to FIG. 2.

Referring to FIG. 12, accumulative correlation values may be updated in operation S61. For example, the synchronizer 194 may accumulate correlation values calculated in M symbol durations based on an accumulative phase difference. Accordingly, a problem of a coherent method of simply accumulating correlation values may be solved. An example of operation S61 will be described below with reference to FIG. 13.

In operation S62, the maximum value of the updated accumulative correlation values may be identified. For example, the synchronizer 194 may calculate $T_{sym}$ accumulative correlation values over M symbol durations, and may identify the maximum value among the $T_{sym}$ accumulative correlation values. As described above, the correlation values may be accumulated based on the accumulative phase difference in operation S61, and accordingly, the maximum value of the accumulative correlation values may indicate a symbol boundary.

In operation S63, the maximum value may be compared with a first reference value $T_c$. For example, the synchronizer 194 may compare the maximum value identified in operation S62 with the first reference value $T_c$. When the maximum value identified in operation S62 is small, an erroneous symbol boundary is detected or that there is no symbol boundary. Accordingly, the synchronizer 194 may determine that a maximum value greater than or equal to the first reference value $T_c$ is valid, while determining that a maximum value less than the first reference value $T_c$ is invalid. As shown in FIG. 12, when the maximum value is less than the first reference value $T_c$, it may be determined in operation S64 that the symbol boundary is undetectable. In some embodiments, when it is determined that the symbol boundary is undetectable, the method of FIG. 8 may be performed again. On the other hand, when the maximum value is equal to or greater than the first reference value $T_c$, operation S65 may be subsequently performed.

In operation S65, a sample index corresponding to the maximum value may be identified. For example, when accumulative correlation values accumulated over M symbol durations are $\bar{r}^{(M)}(n)$, the synchronizer 194 may identify the sample index $n_s$ that satisfies Equation (8) below.

$$n_s = \arg\max_{n \in [0, T_{sym}]} \left|\bar{r}^{(M)}(n)\right| \tag{8}$$

Also, as described above, an accumulative correlation value $\bar{r}^{(M)}(n_s)$ of the sample index $n_s$ may satisfy Equation (9) below.

$$\left|\bar{r}^{(M)}(n_s)\right| > T_c \tag{9}$$

In some embodiments, when the RX antenna 160 of FIG. 2 includes a plurality of (10) antennas, a symbol boundary may be detected from accumulative correlation values respectively calculated from the plurality of antennas. For example, when the accumulative correlation value of an antenna of index i among the total I antennas is $\bar{r}_i^{(M)}(n)$, the synchronizer 194 may identify the sample index $n_s$ satisfying Equation (10) below.

$$n_s = \arg \max_{n \in [0, T_{sym}]} \sum_{i=0}^{I} \left| \bar{r}_i^{(M)}(n) \right|$$

In addition, the sum of the accumulative correlation values for each antenna of the sample index $n_s$ may satisfy Equation (11) below.

$$\left| \sum_{i=0}^{I} \left| \bar{r}_i^{(M)}(n) \right| \right| > T_c \quad (11)$$

Figure 13:
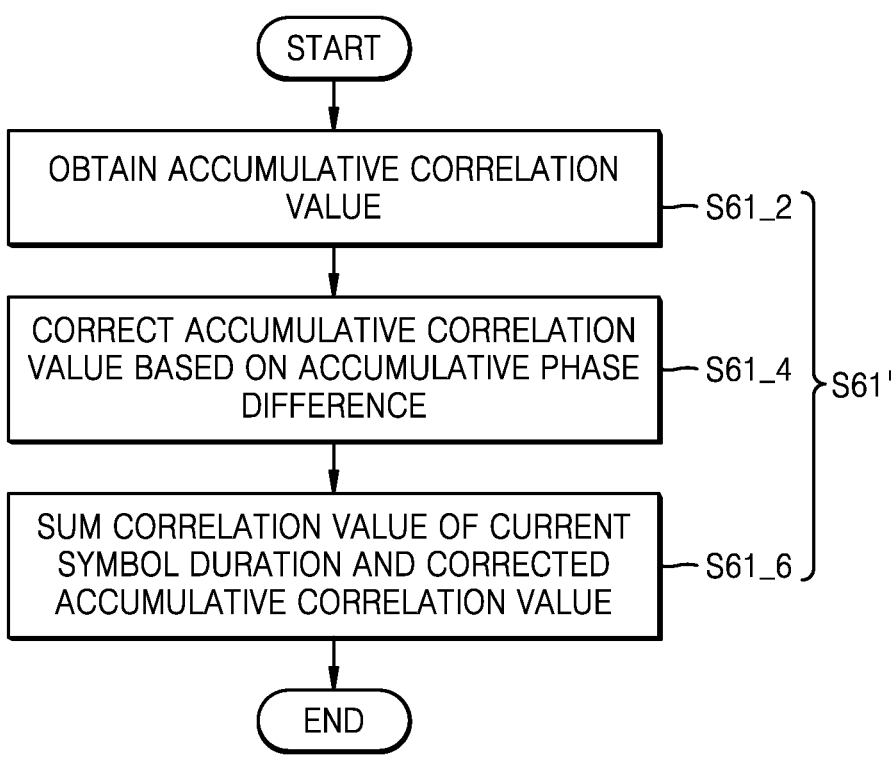
FIG. 13 is a flowchart illustrating a method for high-speed synchronization according to an embodiment.

FIG. 13 is a flowchart illustrating a method for high-speed synchronization according to an embodiment. Specifically, the flowchart of FIG. 13 shows an example of operation S61 of FIG. 12. As described above with reference to FIG. 12, accumulative correlation values may be updated in operation S61' of FIG. 13. As shown in FIG. 13, operation S61' may include a plurality of rounds of operations S61_2, S61_4, and S61_6. In some embodiments, operation S61' of FIG. 13 may be performed by the synchronizer 194 of FIG. 2, and FIG. 13 will be described below with reference to FIG. 2.

Referring to FIG. 13, an accumulative correlation value may be obtained in operation S61_2. For example, the synchronizer 94 may read the accumulative correlation value from a buffer configured to store accumulative correlation values (e.g., BUF4 in FIG. 16A). The read accumulative correlation value may correspond to correlation values accumulated up to a previous symbol duration.

In operation S61_4, the accumulative correlation value may be corrected based on an accumulative phase difference. For example, the synchronizer 194 may shift a phase of the accumulative correlation value obtained in operation S61_2, based on the accumulative phase difference. Accordingly, an accumulative correlation value of which phase difference is compensated for, that is, the corrected accumulative correlation value, may be generated.

In operation S61_6, the correlation value of the current symbol duration and the corrected accumulative correlation value may be summed. For example, the synchronizer 194 may generate an updated accumulative correlation value by adding the accumulative correlation value corrected in operation S61_4 to the correlation value of the current symbol duration. The accumulative correlation value $\bar{r}^{(m)}(n)$ of the first symbol duration $S'_m$ may be calculated from the accumulative correlation value $\bar{r}^{(m-1)}(n)$ of the second symbol duration $S'_{m-1}$ and the updated accumulative phase difference $P_d^{(m)}(n)$ as in Equation (12) below.

$$\bar{r}^{(m)}(n) = r^{(m)}(n) + \bar{r}^{(m-1)}(n)e^{j \angle P_d^{(m)}(n)} \quad (12)$$

The second term on the right side of Equation (12), i.e., $$\bar{r}^{(m-1)}(n)e^{j \angle P_d^{(m)}(n)},$$

may correspond to the accumulative correlation value corrected in operation S61_4.

Figure 14:
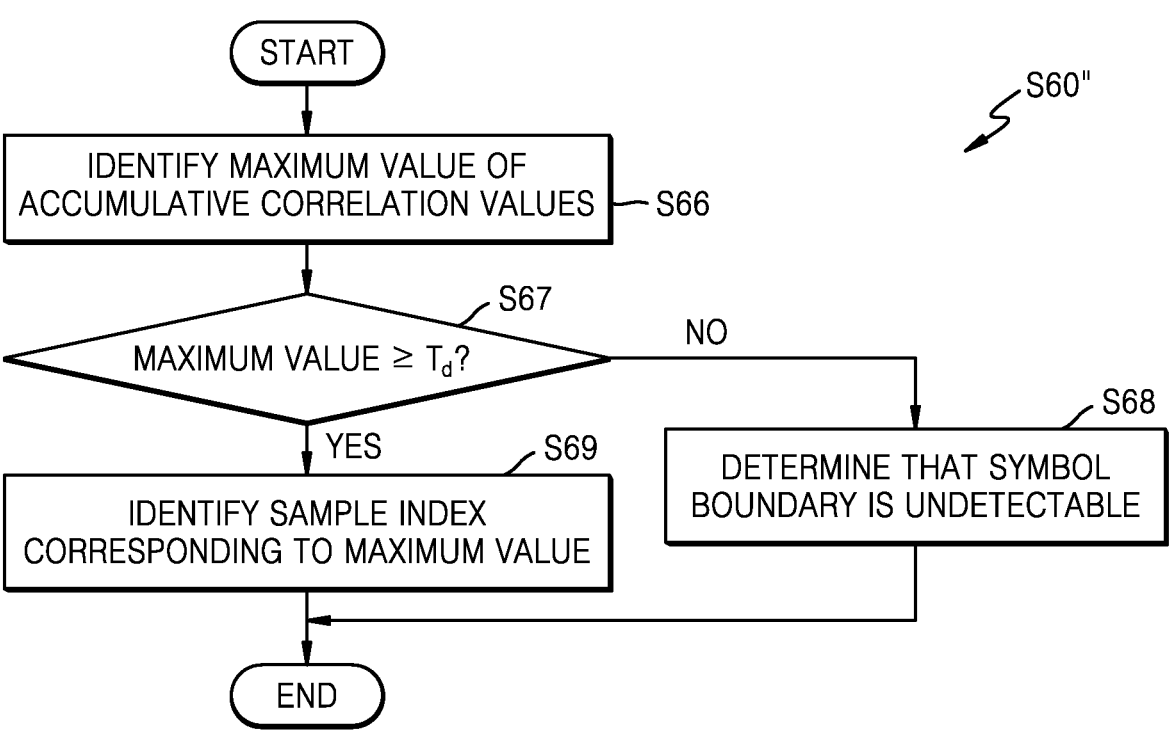
FIG. 14 is a flowchart illustrating a method for high-speed synchronization according to an embodiment.

FIG. 14 is a flowchart illustrating a method for high-speed synchronization according to an embodiment. Specifically, the flowchart of FIG. 14 shows an example of operation S60 of FIG. 8. As described above with reference to FIG. 8, a symbol boundary may be detected in operation S60" of FIG. 13. As shown in FIG. 14, operation S60" may include a plurality of operations S66 to S69. In some embodiments, operation S60" may be performed by the synchronizer 194 of FIG. 2, and FIG. 14 will be described below with reference to FIG. 2.

Referring to FIG. 14, a maximum value among accumulative phase differences may be identified in operation S66. As described above with reference to the drawings, the maximum value of accumulative phase differences as well as a maximum value of accumulative correlation values may occur at a symbol boundary. Accordingly, instead of calculating the accumulative correlation value based on the accumulative phase difference, the symbol boundary may be directly detected from accumulative phase differences. For example, the synchronizer 194 may identify the maximum value among accumulative phase differences accumulated in M symbol durations.

In operation S67, the maximum value may be compared with a second reference value $T_d$. For example, the synchronizer 194 may compare the maximum value identified in operation S66 with the second reference value $T_d$. When the maximum value identified in operation S66 is small, an erroneous symbol boundary is detected or that there is no symbol boundary. Accordingly, the synchronizer 194 may determine that the maximum value equal to or greater than the second reference value $T_d$ is valid, while determining that the maximum value less than the second reference value $T_d$ is invalid. As shown in FIG. 14, when the maximum value is less than the second reference value $T_d$, it may be determined that the symbol boundary is undetectable in operation 568. In some embodiments, when it is determined that the symbol boundary is undetectable, the method of FIG. 8 may be performed again. On the other hand, when the maximum value is equal to or greater than the second reference value $T_d$, operation S69 may be subsequently performed.

In operation S69, a sample index corresponding to the maximum value may be identified. For example, the synchronizer 194 may identify the sample index $n_s$ that satisfies Equation (13) below.

$$n_s = \arg \max_{n \in [0, T_{sym}]} \left| P_d^{(M)}(n) \right| \quad (13)$$

Also, as described above, the accumulative phase difference $P_d^{(M)}(n)$ of the sample index $n_s$ may satisfy Equation (14) below.

$$|P_d^{(M)}(n)| > T_d \quad (14)$$

In some embodiments, when the RX antenna 160 of FIG. 2 includes a plurality of antennas, the symbol boundary may be detected from accumulative phase differences respectively calculated from the plurality of antennas. For example, when an accumulative phase difference of the antenna of the index i among the total I antennas is $P_{i,d}^{(M)}$ (n), the synchronizer 194 may identify the sample index $n_s$ that satisfies Equation (15) below.

$$n_s = \arg\max_{n \in [0, T_{sym}]} \sum_{i=0}^{I} P_{i,d}^{(M)}(n) \tag{15}$$

In addition, the sum of the accumulative phase differences for each antenna of the sample index $n_s$ may satisfy Equation (16) below.

$$\left| \sum_{i=0}^{I} \left| P_{i,d}^{(M)}(n) \right| \right| > T_d \tag{16}$$

Figure 15:
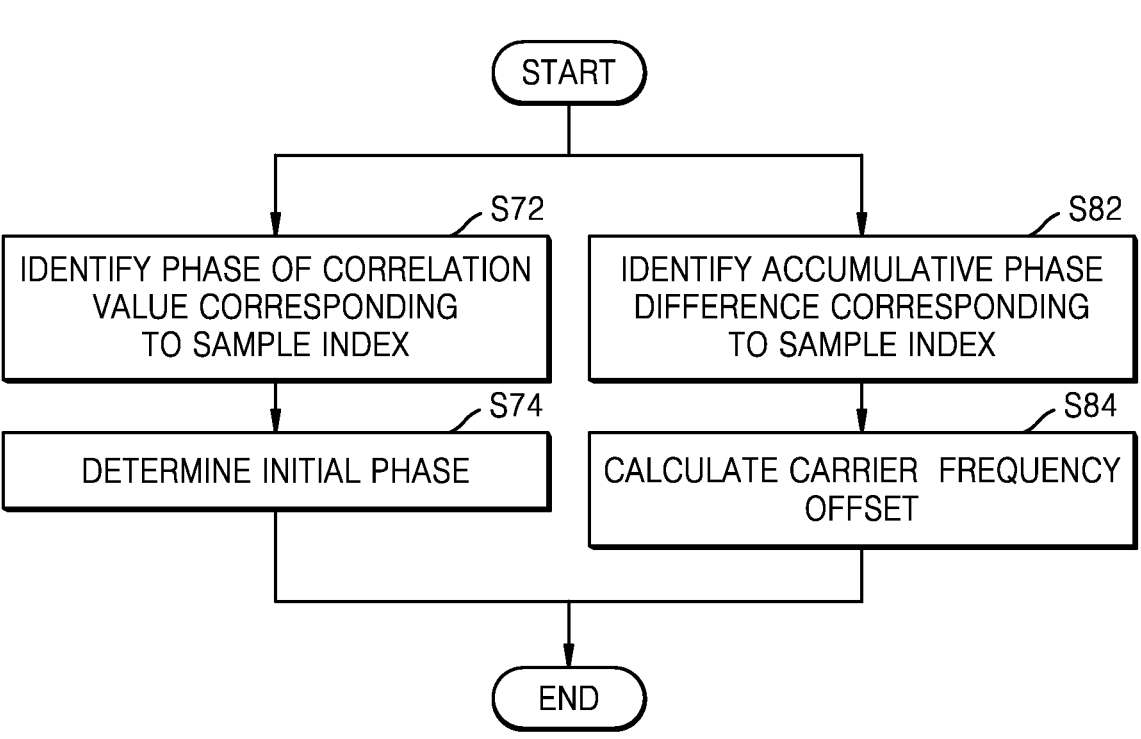
FIG. 15 is a flowchart illustrating a method for high-speed synchronization according to an embodiment.

FIG. 15 is a flowchart illustrating a method for high-speed synchronization according to an embodiment. Specifically, FIG. 15 shows a method for frequency synchronization. As shown in FIG. 15, the method for high-speed synchronization may include a plurality of rounds of operations S72, S74, S82, and S84. In some embodiments, the method of FIG. 15 may be performed after operation S60 of FIG. 8 is performed, and may use the sample index $n_s$ corresponding to a symbol boundary. In some embodiments, the method of FIG. 15 may be performed by the synchronizer 194 of FIG. 2. Hereinafter, FIG. 15 will be described with reference to FIG. 2.

Referring to FIG. 15, a phase corresponding to an index identified in operation S72 may be identified, and an initial phase may be determined in operation S74. For example, the synchronizer 194 may identify a phase of a correlation value $r^{(m-1)}(n_s)$ corresponding to the sample index $n_s$, and determine the phase of the correlation value $r^{(m-1)}(n_s)$ to be the initial phase. The synchronizer 194 may provide information about the initial phase to the RX filter 192.

An accumulative phase difference corresponding to a sample index may be identified in operation S82, and a carrier frequency offset may be calculated in operation S84. For example, the synchronizer 194 may identify an accumulative phase difference $P_d^{(M)}(n_s)$ corresponding to the sample index $n_s$, and calculate a carrier frequency offset based on a phase of the accumulative phase difference $P_d^{(M)}(n_s)$. The carrier frequency offset $\hat{F}_{init\_offset}$ may be calculated as in Equation (17) below.

$$\hat{F}_{init\_offset} = \frac{\angle P_d^{(M)}(n_s)}{T_{sym}} \cong \frac{\theta_{fo}^{(M)}(n_s)}{T_{sym}} \tag{17}$$

In Equation (17), $\theta_{fo}^{(M)}(n_s)$ may mean a phase change due to the carrier frequency offset.

Figure 16A:
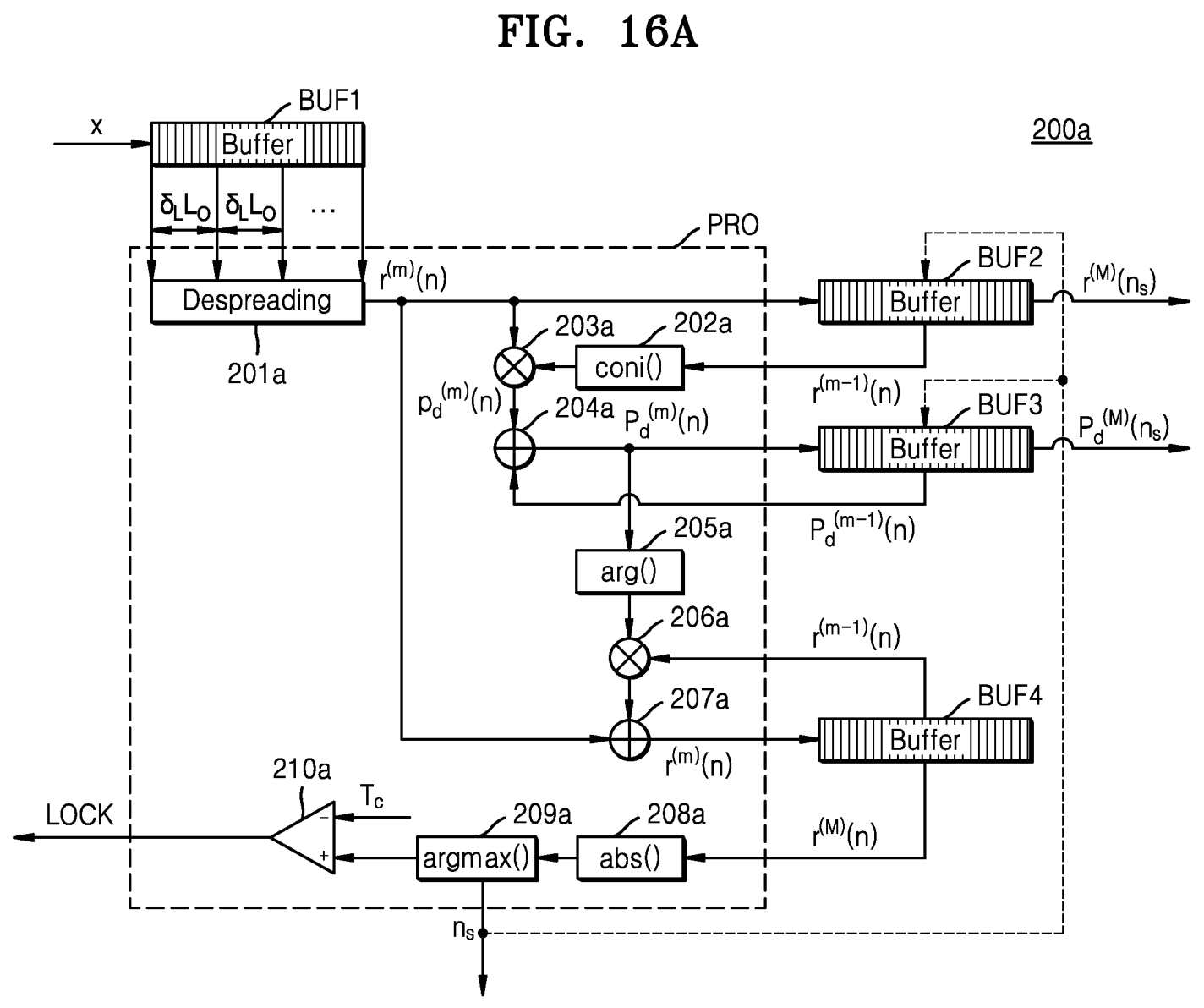
Figure 16B:
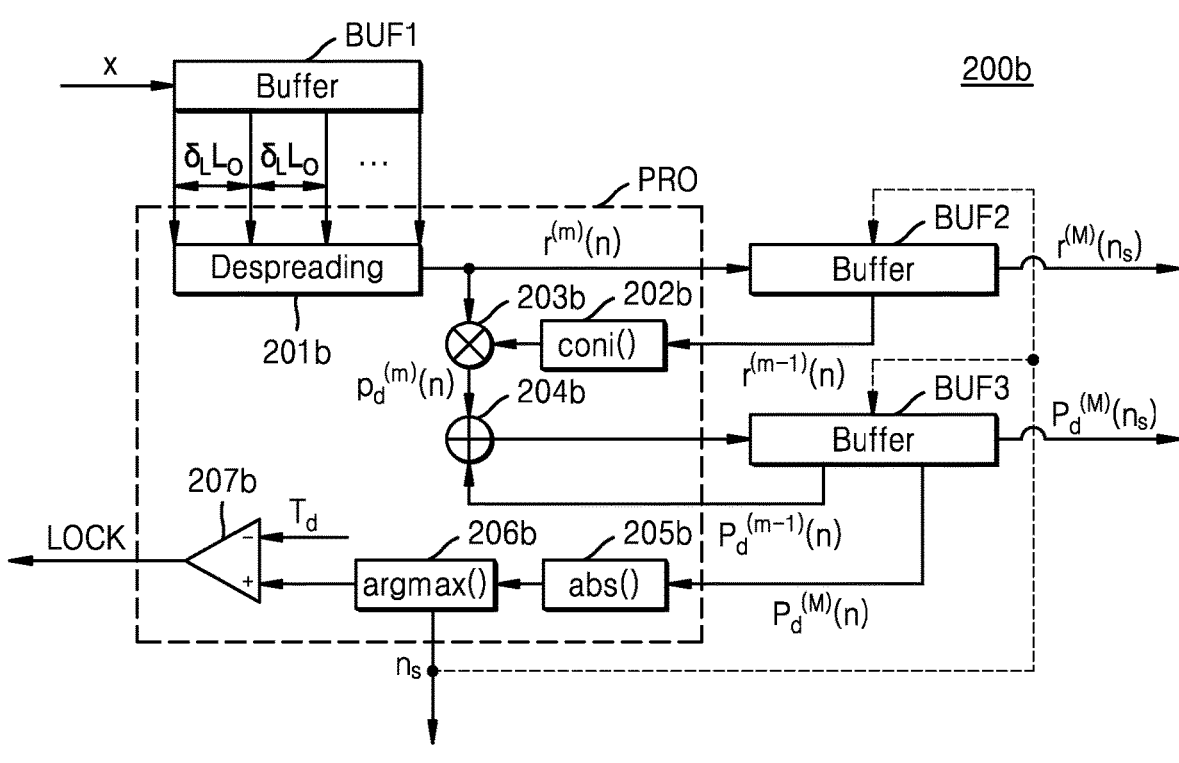

FIGS. 16A and 16B are block diagrams illustrating examples of synchronizers 200a and 200b respectively according to embodiments. Specifically, the block diagram of FIG. 16A shows the synchronizer 200a performing operation S60' of FIG. 12, and the block diagram of FIG. 16B shows the synchronizer 200b performing operation S60" of FIG. 14.

Referring to FIG. 16A, the synchronizer 200a may include first to fourth buffers BUF1 to BUF4 and a processing circuit PRO. The processing circuit PRO may store data in the first to fourth buffers BUF1 to BUF4 and read data stored in the first to fourth buffers BUF1 to BUF4. The first to fourth buffers BUF1 to BUF4 may have a structure capable of storing data. In some embodiments, the first to fourth buffers BUF1 to BUF4 may correspond to regions of a memory device, and the processing circuit PRO may access the first to fourth buffers BUF1 to BUF4 through an address. In some embodiments, the first to fourth buffers BUF1 to BUF4 may include registers dedicated to the processing circuit PRO. The modules included in the processing circuit PRO in FIGS. 16A and 16B may correspond to an independent circuit, a software block (procedure or subroutine) executed by a processor, or a combination thereof.

The processing circuit PRO may include first to tenth modules 201a to 210a. The input sample x may be stored in the first buffer BUF1. For example, the first buffer BUF1 may store input samples corresponding to one symbol duration. As described above with reference to FIG. 9, the first module 201a may read the n-th input sample and the input samples spaced apart from each other by an interval corresponding to $\delta_L$ chips of delta length, i.e., $\delta_L Lo$ indexes, from the first buffer BUF1, and calculate a correlation value $r^{(m)}(n)$ based on the read input samples and a preamble code. As shown in FIG. 16A, the correlation value $r^{(m)}(n)$ may be stored in the second buffer BUF2. According to an embodiment, the first module 201a may calculate a plurality of correlation values respectively corresponding to a plurality of read input samples.

The second module 202a may read a correlation value $r^{(m-1)}(n)$ corresponding to the n-th input sample in a previous symbol duration from the second buffer BUF2, and provide a complex conjugate of the correlation value $r^{(m-1)}(n)$ to the third module 203a. The third module 203a may multiply the correlation value $r^{(m)}(n)$ of the current symbol duration by the complex conjugate of the correlation value $r^{(m-1)}(n)$ of the previous symbol duration, and generate the phase difference $p_d^{(m)}(n)$. The fourth module 204a may read an accumulative phase difference $p_d^{(m-1)}(n)$ calculated up to the previous symbol duration from the third buffer BUF3. The fourth module 204a may sum the phase difference $p_d^{(m)}(n)$ calculated in the current symbol duration by the third module 203a and the accumulative phase difference $p_d^{(m-1)}(n)$ read from the third buffer BUF3, generate an accumulative phase difference $P_d^{(m)}(n)$, and store the accumulative phase difference $P_d^{(m)}(n)$ in the third buffer BUF3.

The fifth module 205a may receive the accumulative phase difference $P_d^{(m)}(n)$ from the fourth module 204a, and provide the phase of the accumulative phase difference $P_d^{(m)}(n)$ to the sixth module 206a. The sixth module 206a may read an accumulative correlation value $\bar{r}^{(m-1)}(n)$ calculated up to the previous symbol duration from the fourth buffer BUF4, and provide the accumulative correlation value $\bar{r}^{(m-1)}(n)$ shifted by the phase provided from the fifth module 205a to the seventh module 207a. The seventh module 207a may sum the correlation value $r^{(m)}(n)$ of the current symbol duration and the corrected accumulative correlation value provided from the sixth module 206a, and generate an accumulative correlation value $\bar{r}^{(m)}(n)$. As shown in FIG. 16A, the seventh module 207a may store the accumulative correlation value $\bar{r}^{(m)}(n)$ in the fourth buffer BUF4.

When operations of the first to seventh modules 201a to 207a are completed on M symbol durations, the second buffer BUF2 may store $T_{sym}$ correlation values $\{r^{(M)}(n) | 0 \le n \le T_{sym}-1\}$, the third buffer BUF3 may store $T_{sym}$ accumulative phase differences $\{P_d^{(M)}(n) | 0 \le n \le T_{sym}-1\}$, and the fourth buffer BUF4 may store $T_{sym}$ accumulative correlation values $\{\bar{r}^{(M)}(n)|0 \leq n \leq T_{sym}-1\}$.

The eighth module 208a may read the accumulative correlation value $\bar{r}^{(M)}$ (n) from the fourth buffer BUF4, and provide an absolute value $|\bar{r}^{(M)}(n)|$ of the accumulative correlation value $\bar{r}^{(M)}$ (n) to the ninth module 209a. The ninth module 209a may identify a maximum value among absolute values provided from the eighth module 208a, and may provide the identified maximum value to the tenth module 210a. The tenth module 210a may compare the maximum value provided from the ninth module 209a with the first reference value $T_c$, and when the maximum value is equal to or greater than the first reference value $T_c$, output an activated signal LOCK indicating completion of synchronization.

As shown in FIG. 16A, the ninth module 209a may identify the sample index $n_s$ corresponding to the maximum value. As indicated by a dashed arrow in FIG. 16A, a correlation value $r^{(M)}(n_s)$ corresponding to the sample index $n_s$ may be read among correlation values stored in the second buffer BUF2, and the phase of the correlation value $r^{(M)}(n_s)$ may be determined as an initial phase. Also, as indicated by a dashed arrow in FIG. 16A, an accumulative phase difference $P_d^{(M)}(n_s)$ corresponding to the sample index $n_s$ among the correlation values stored in the third buffer BUF3 may be read from the third buffer BUF3, and a carrier frequency offset may be calculated based on the phase of the accumulative phase difference $P_d^{(M)}(n_s)$.

Referring to FIG. 16B, the synchronizer 200b may include the first to third buffers BUF1 to BUF3 and the processing circuit PRO. In some examples, compared with the synchronizer 200a of FIG. 16A, the fourth buffer BUF4 might not be included in the synchronizer 200b of FIG. 16B. The processing circuit PRO may include first to seventh modules 201b to 207b. The first to fourth modules 201b to 204b may operate in the same manner as the first to fourth modules 201a to 204a of FIG. 16A.

The fifth module 205b may read the accumulative phase difference $P_d(M)(n)$ from the third buffer BUF3, and provide an absolute value $|P_d^{(M)}(n)|$ of the accumulative phase difference $P_d^{(M)}(n)$ to the sixth module 206b. The sixth module 206b may identify a maximum value among absolute values provided from the fifth module 205b, and may provide the identified maximum value to the seventh module 207b. The seventh module 207b may compare the maximum value provided from the sixth module 206b with the second reference value $T_d$, and when the maximum value is equal to or greater than the second reference value $T_d$, output the activated signal LOCK indicating completion of synchronization.

Figure 17:
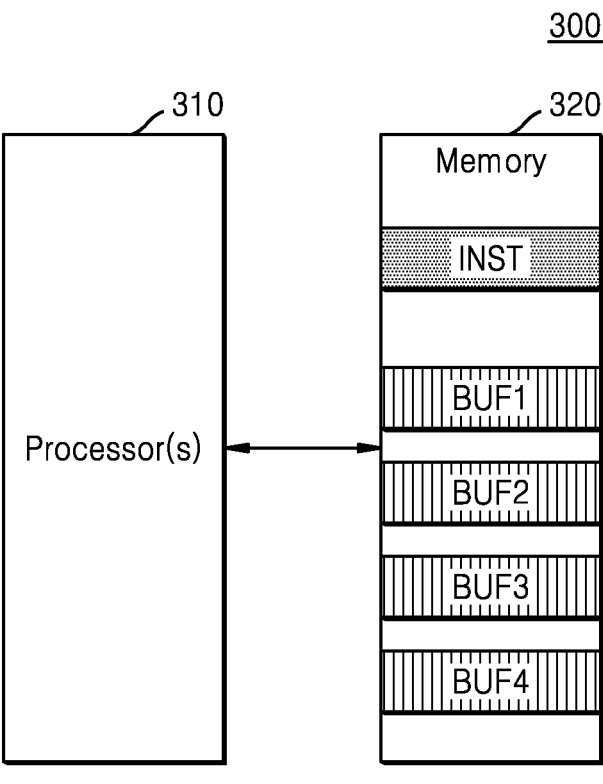
FIG. 17 is a block diagram illustrating a synchronizer according to an embodiment.

FIG. 17 is a block diagram illustrating a synchronizer 300 according to an embodiment. As shown in FIG. 17, the synchronizer 300 may include at least one processor 310 and a memory 320. The at least one processor 310 may access the memory 320, and the memory 320 may include a series of instructions INST and the first to fourth buffers BUF1 to BUF4. In some embodiments, as described above with reference to FIG. 16B, the fourth buffer BUF4 may be omitted from the memory 320.

In some embodiments, at least part of the method for high-speed synchronization described above with reference to the drawings may be performed by the at least one processor 310 executing the series of instructions INST stored in the memory 320. For example, the at least one processor 310 may perform at least one of operations of FIG. 8 and at least one of operations of FIG. 15, by executing the series of instructions INST. In some embodiments, the at least one processor 310 may include a cache memory, and may store data read from the memory 320 in the cache memory or write data stored in the cache memory into the memory 320.

The memory 320 may have any structure accessible by the at least one processor 310. For example, the memory 320 may include a volatile memory device, such as dynamic random access memory (DRAM) and static random access memory (SRAM), or a non-volatile memory device, such as flash memory. In some embodiments, the memory 320 may include two or more memory devices, and the series of instructions INST and the first to fourth buffers BUF1 to BUF4 may be stored in the two or more memory devices. For example, the series of instructions INST may be stored in a first memory device, and the first to fourth buffers BUF1 to BUF4 may be implemented in a second memory device.

While the present disclosure has been particularly shown and described with reference to embodiments thereof, it will be understood that various changes in form and details may be made therein without departing from the spirit and scope of the following claims.

What is claimed is:

1. A method comprising:
   calculating first correlation values corresponding to a first symbol duration based on input samples, the input samples being generated from a received signal;
   calculating phase differences respectively corresponding to the input samples based on the first correlation values and second correlation values corresponding to a second symbol duration preceding the first symbol duration;
   updating accumulative phase differences respectively corresponding to the input samples based on the phase differences; and
   detecting a symbol boundary based on the updated accumulative phase differences.

2. The method of claim 1, wherein the first correlation values and the second correlation values are complex numbers,
   wherein calculating the phase differences comprises:
   obtaining a first correlation value from the first correlation values and a second correlation value from the second correlation values, the first correlation value and the second correlation value corresponding to a same index of an input sample;
   calculating a complex conjugate of the obtained second correlation value; and
   multiplying the obtained first correlation value by the calculated complex conjugate of the obtained second correlation value.

3. The method of claim 1, wherein the phase differences and the accumulative phase differences are complex numbers,
   wherein updating the accumulative phase differences comprises:
   obtaining a phase difference from the phase differences and an accumulative phase difference from the accumulative phase differences, the phase difference and the accumulative phase difference corresponding to a same index of an input sample; and
   summing the obtained phase difference and the obtained accumulative phase difference.

4. The method of claim 3, wherein updating the accumulative phase differences further comprises setting the accumulative phase difference to zero when the first symbol duration is an initial symbol duration.

5. The method of claim 1, wherein detecting the symbol boundary comprises:

updating accumulative correlation values based on the first correlation values and the updated accumulative phase differences;

identifying a maximum value among the updated accumulative correlation values; and determining an index of an input sample corresponding to the maximum value.

6. The method of claim 5, wherein updating the accumulative phase differences further comprises:

correcting the accumulative correlation value based on the updated accumulative phase difference; and summing the first correlation value and the corrected accumulative correlation value.

7. The method of claim 5, wherein detecting the symbol boundary further comprises:

comparing the maximum value with a first reference value; and when the maximum value is less than the first reference value, determining that the symbol boundary is undetectable.

8. The method of claim 1, wherein the detecting of the symbol boundary further comprises:

identifying a maximum value among the updated accumulative phase differences; and determining an index of an input sample corresponding to the maximum value.

9. The method of claim 8, wherein detecting the symbol boundary further comprises:

comparing the maximum value with a second reference value; and when the maximum value is less than the second reference value, determining that the symbol boundary is undetectable.

10. The method of claim 1, wherein each of the first symbol duration and the second symbol duration corresponds to a duration of a single symbol included in a SYNC field included in a synchronization header (SHR).

11. An apparatus comprising:

a first buffer configured to store input samples generated from a received signal and corresponding to a first symbol duration;

a processing circuit configured to calculate first correlation values respectively corresponding to the input samples based on the input samples;

a second buffer configured to store second correlation values corresponding to a second symbol duration preceding the first symbol duration; and a third buffer configured to store accumulative phase differences respectively corresponding to the input samples, wherein the processing circuit is further configured to:

calculate phase differences respectively corresponding to the input samples, based on the first correlation values and the second correlation values;

update the accumulative phase differences based on the phase differences; and detect a symbol boundary based on the updated accumulative phase differences.

12. The apparatus of claim 11, wherein the first correlation values and the second correlation values are complex numbers, wherein the processing circuit is further configured to read a second correlation value from the second buffer, the second correlation value corresponding to a same index of an input sample corresponding to a first correlation value; and calculate the phase differences by multiplying the first correlation value by a complex conjugate of the read second correlation value.

13. The apparatus of claim 11, wherein the phase differences and the accumulative phase differences are complex numbers, wherein the processing circuit is further configured to read an accumulative phase difference from the third buffer, the accumulative phase difference corresponding to a same index of an input sample corresponding to one of the phase differences; and update the accumulative phase differences by summing the one of the phase differences and the read accumulative phase difference.

14. The apparatus of claim 13, wherein the processing circuit is further configured to set the accumulative phase difference to zero when the first symbol duration is an initial symbol duration.

15. The apparatus of claim 11, wherein the processing circuit is further configured to update accumulative correlation values based on the first correlation values and the updated accumulative phase differences;

identify a maximum value among the updated accumulative correlation values; and determine an index of an input sample corresponding to the maximum value.

16. The apparatus of claim 15, further comprising: a fourth buffer configured to store accumulative correlation values, wherein the processing circuit is further configured to read the accumulative correlation value from the fourth buffer;

correct the read accumulative correlation value based on the updated accumulative phase difference; and update the accumulative correlation values by summing the first correlation value and the corrected accumulative correlation value.

17. The apparatus of claim 11, wherein the processing circuit is further configured to determine an index of a input sample corresponding to a maximum value of the updated accumulative phase differences.

18. The apparatus of claim 11, wherein the processing circuit is further configured to identify a phase of a first correlation value corresponding to the detected symbol boundary, and determine the identified phase to be an initial phase.

19. The apparatus of claim 11, wherein the processing circuit is further configured to calculate a carrier frequency offset based on the first symbol duration and an accumulative phase difference corresponding to the detected symbol boundary.

20. An apparatus comprising:

a memory storing a series of instructions; and at least one processor configured to, by executing the series of instructions, calculate first correlation values corresponding to a first symbol duration and respectively corresponding to input samples, the input samples being generated from a received signal;

calculate phase differences respectively corresponding to the input samples, based on the first correlation values and second correlation values corresponding to a second symbol duration preceding the first symbol duration;

update accumulative phase differences respectively corresponding to the input samples based on the phase differences; and detect a symbol boundary based on the updated accumulative phase differences.

* * * * *